US010911172B2

(12) United States Patent
Sano et al.

(10) Patent No.: US 10,911,172 B2
(45) Date of Patent: *Feb. 2, 2021

(54) USER APPARATUS, BASE STATION, INTERFERENCE REDUCING METHOD AND INTERFERENCE REDUCING CONTROL INFORMATION NOTIFICATION METHOD

(71) Applicant: NTT DOCOMO, INC., Tokyo (JP)

(72) Inventors: Yousuke Sano, Tokyo (JP); Yusuke Ohwatari, Tokyo (JP); Satoshi Nagata, Tokyo (JP); Yuta Sagae, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/654,853

(22) PCT Filed: Sep. 30, 2013

(86) PCT No.: PCT/JP2013/076551
§ 371 (c)(1),
(2) Date: Jun. 23, 2015

(87) PCT Pub. No.: WO2014/103455
PCT Pub. Date: Jul. 3, 2014

(65) Prior Publication Data
US 2015/0341131 A1 Nov. 26, 2015

(30) Foreign Application Priority Data

Dec. 28, 2012 (JP) ................................ 2012-288896

(51) Int. Cl.
*H04J 11/00* (2006.01)
*H04W 72/04* (2009.01)
(Continued)

(52) U.S. Cl.
CPC ............ *H04J 11/005* (2013.01); *H04B 7/024* (2013.01); *H04B 7/0615* (2013.01);
(Continued)

(58) Field of Classification Search
CPC . H04W 72/082; H04W 72/042; H04J 11/005; H04L 5/0053; H04L 5/0073
See application file for complete search history.

(56) References Cited

U.S. PATENT DOCUMENTS 8,938,247 B2 * 1/2015 Gorokhov ............. H04B 7/024
370/256
2008/0159451 A1 7/2008 Majonen
(Continued)

FOREIGN PATENT DOCUMENTS

EP 2 523 490 A1 11/2012
KR 2012-0135871 A 12/2012
(Continued)

OTHER PUBLICATIONS

Extended European Search Report in counterpart European Application No. 13 86 8480.8 dated Nov. 20, 2015 (11 pages).
(Continued)

*Primary Examiner* — Jung H Park
(74) *Attorney, Agent, or Firm* — Osha Bergman Watanabe & Burton LLP

(57) ABSTRACT

A user apparatus, in a radio communication system including a plurality of base stations, including a reception unit configured to receive, from a connecting base station, control information to be used for reducing an interference signal sent from an interference base station for the user apparatus; and an interference reducing unit configured to reduce the interference signal by using the control information to obtain a desired signal sent from the connecting base station.

16 Claims, 32 Drawing Sheets

| | INFORMATION ELEMENT | ESSENTIAL or ARBITRARY |
|---|---|---|
| COMMON PART | TM | ARBITRARY (EXAMPLE: UNNECESSARY WHEN UNIFIED IN THE WHOLE SYSTEM) |
| | PCID or VCID | ESSENTIAL |
| | SLOT NUMBER | ARBITRARY (CAN BE ESTIMATED BY CURRENT PSS/SSS) |
| | $N_{CP}$ | ARBITRARY (EXAMPLE: UNNECESSARY WHEN UNIFIED IN THE WHOLE SYSTEM) |
| | RI | ARBITRARY (ALTHOUGH CHARACTERISTICs DETERIORATE IF NOT SEND, INFORMATION AMOUNT CAN BE DECREASED) |
| | USER ASSIGNMENT INFORMATION | ESSENTIAL |
| CRS BASED | NUMBER OF CRS ANTENNA PORTs | ESSENTIAL |
| | MBSFN CONFIG. | ESSENTIAL |
| | SYSTEM BANDWIDTH | ESSENTIAL |
| | CRS POWER BOOSTING INFORMATION | ESSENTIAL |
| | PMI | ARBITRARY (ALTHOUGH CHARACTERISTICs DETERIORATE IF NOT SEND, INFORMATION AMOUNT CAN BE DECREASED) |
| CSI-RS BASED | NUMBER OF CSI-RS ANTENNA PORTs | ESSENTIAL |
| | SYSTEM BANDWIDTH | ESSENTIAL |
| | CSI-RS POWER BOOSTING INFORMATION | ESSENTIAL |
| | PMI | ARBITRARY (ALTHOUGH CHARACTERISTICs DETERIORATE IF NOT SEND, INFORMATION AMOUNT CAN BE DECREASED) |
| DM-RS BASED | $n_{SCID}$ | ARBITRARY (EXAMPLE: ALTHOUGH OPERATION IS POSSIBLE EVEN WHEN ALWAYS 0, CHARACTERISTICs DETERIORATE) |
| | NUMBER OF DM-RS ANTENNA PORTs | ESSENTIAL |
| | DM-RS POWER BOOSTING INFORMATION | ESSENTIAL |
| | PDSCH TRANSMISSION BANDWIDTH | ESSENTIAL |

(51) Int. Cl.
*H04W 16/28* (2009.01)
*H04B 7/06* (2006.01)
*H04B 7/08* (2006.01)
*H04B 7/024* (2017.01)
*H04L 1/00* (2006.01)
*H04L 25/02* (2006.01)
*H04W 72/12* (2009.01)
*H04L 27/26* (2006.01)

(52) U.S. Cl.
CPC ......... *H04B 7/0854* (2013.01); *H04L 1/0026* (2013.01); *H04L 25/0224* (2013.01); *H04W 16/28* (2013.01); *H04W 72/042* (2013.01); *H04L 27/2613* (2013.01); *H04W 72/1226* (2013.01)

(56) References Cited

U.S. PATENT DOCUMENTS

| | | | |
|---|---|---|---|
| 2011/0199986 A1 | 8/2011 | Fong et al. | |
| 2012/0082022 A1 | 4/2012 | Damnjanovic et al. | |
| 2012/0190391 A1* | 7/2012 | Yoo | H04J 11/005 455/501 |
| 2013/0034070 A1* | 2/2013 | Seo | H04B 7/155 370/329 |
| 2013/0089040 A1* | 4/2013 | Tabet | H04L 5/0073 370/329 |
| 2013/0196701 A1* | 8/2013 | Tiirola | H04J 11/0026 455/501 |
| 2013/0242885 A1* | 9/2013 | Zhu | H04W 52/243 370/329 |
| 2013/0279361 A1* | 10/2013 | Seo | H04J 11/0053 370/252 |
| 2013/0301542 A1* | 11/2013 | Krishnamurthy | H04W 52/50 370/329 |
| 2014/0036747 A1* | 2/2014 | Nory | H04W 72/0406 370/311 |
| 2014/0119311 A1* | 5/2014 | Weber | H04W 52/143 370/329 |
| 2014/0204853 A1 | 7/2014 | Ko et al. | |
| 2014/0348126 A1* | 11/2014 | Seo | H04L 5/0005 370/330 |
| 2015/0009794 A1 | 1/2015 | Damnjanovic et al. | |

FOREIGN PATENT DOCUMENTS

| | | |
|---|---|---|
| WO | 2010/049970 A1 | 5/2010 |
| WO | 2011130451 A1 | 10/2011 |
| WO | 2012169799 A2 | 12/2012 |

OTHER PUBLICATIONS

Motorola Mobility; "Interference Measurements based on CSI-RS"; 3GPP TSG RAN1 #67, R1-114023; San Francisco, USA; Nov. 14-18, 2011 (4 pages).

NTT DOCOMO; "Summary of ad hoc session on FeICIC simulation assumptions"; 3GPP TSG RAN WG1 Meeting #66, R1-112856; Athens, Greece; Aug. 22-26, 2011 (2 pages).
International Search Report issued in PCT/JP2013/076551 dated Jan. 7, 2014 (1 page).
Written Opinion of the International Searching Authority issued in PCT/JP2013/076551 dated Jan. 7, 2014 (3 pages).
New Postcom; "Considerations on signalling support for FeICIC"; 3GPP TSG RAN WG1 Meeting #67, R1-113705; San Francisco, USA; Nov. 14-18, 2011 (4 pages).
3GPP TS 36.211 V11.3.0; "3rd Generation Partnership Project; Technical Specification Group Radio Access Network; Evolved Universal Terrestrial Radio Access (E-UTRA); Physical Channels and Modulation (Release 11)"; Jun. 2013 (108 pages).
3GPP TS 36.212 V11.3.0; "3rd Generation Partnership Project; Technical Specification Group Radio Access Network; Evolved Universal Terrestrial Radio Access (E-UTRA); Multiplexing and channel coding (Release 11)"; Jun. 2013 (84 pages).
3GPP TS 36.213 V11.3.0; "3rd Generation Partnership Project; Technical Specification Group Radio Access Network; Evolved Universal Terrestrial Radio Access (E-UTRA); Physical layer procedures (Release 11)"; Jun. 2013 (176 pages).
Editor (Ericsson); "Inclusion of Rel-11 features"; 3GPP TSG-RAN WG1 Meeting #70, R1-124010; Qingdao, China; Aug. 13-17, 2012 (99 pages).
Hoeher, P. et al.; "Two-Dimensional Pilot-Symbol-Aided Channel Estimation by Wiener Filtering"; in Proc., IEEE International Conference on Acoustics, Speech, and Signal Processing (ICASSP) Munich, Germany, Apr. 1997, pp. 1845-1848 (5 pages).
Renesas Mobile Europe Ltd.; "Interference aware receiver modeling at system level"; 3GPP TSG-RAN WG1 Meeting #65, R1-111562; Barcelona, Spain; May 9-13, 2011 (6 pages).
Axnas, J. et al.; "Successive Interference Cancellation Techniques for LTE Downlink"; IEEE 22nd International Symposium on Personal, Indoor and Mobile Radio Communications, 2011, pp. 1793-1797 (5 pages).
RAN WG1; "LS on Additional Agreements on RRC Signaling for CoMP"; 3GPP TSG RAN WG1 Meeting #71, R1-125353; New Orleans, USA; Nov. 12-16, 2012 (2 pages).
DL CoMP Rapporteur (Samsung); "RRC Parameters for Downlink CoMP"; 3GPP TSG RAN WG1 #70bis, R1-124669; San Diego, USA; Oct. 8-12, 2012 (5 pages).
Office Action issued in the counterpart Japanese Patent Application No. 2014-554191, dated Jun. 13, 2017 (5 pages).
Office Action issued in corresponding Japanese Patent Application No. 2014-554191, dated Sep. 12, 2017 (5 pages).
Office Action issued in corresponding European Patent Application No. 13868480.8, dated Sep. 1, 2017 (4 pages).
Office Action issued in corresponding Chinese Application No. 201380071569.0, dated Jan. 31, 2018 (20 pages).
Office Action issued in the counterpart European Patent Application No. 13868480.8, dated May 3, 2018 (6 pages).
Office Action issued in counterpart Chinese Patent Application No. 201380071569.0, dated Nov. 2, 2018 (15 Pages).

\* cited by examiner

- TYPE 1: IN A CASE WHERE CHANNEL OF INTERFERENCE SIGNAL CAN BE ESTIMATED $$W_{IRC} = \frac{P_{00}}{N_{Stream,00}} \hat{G}_{00}^H(k,l) \left( \sum_{i=0}^{N_{cell}-1} \sum_{j=0}^{N_{user}-1} \frac{P_{ij}}{N_{Stream,ij}} \hat{G}_{ij}(k,l) \hat{G}_{ij}^H(k,l) + \sigma_N^2 I \right)^{-1}$$

→ COVARIANCE MATRIX FORMED BY CHANNEL MATRIX OF INTERFERENCE CELL

- TYPE 2: IN A CASE WHERE CHANNEL OF INTERFERENCE SIGNAL CANNOT BE ESTIMATED $$W_{IRC} = \frac{P_{00}}{N_{Stream,00}} \hat{G}_{00}^H(k,l) \left( \hat{G}_{00}(k,l) \hat{G}_{00}^H(k,l) + \hat{R}_{I+N} \right)^{-1}$$

→ COVARIANCE MATRIX (STATISTICAL VALUE) OF NOISE INTERFERENCE COMPONENT ESTIMATED FROM REFERENCE SIGNAL FROM CONNECTING CELL

INTERFERENCE SUPPRESSION ABILITY IS HIGHER IN TYPE 1

$G_{ij}$ : CHANNEL MATRIX AFTER MULTIPLICATION OF TRANSMISSION WEIGHT MATRIX OF $j$-TH UE ON THE SAME RESOURCE IN $i$-TH CELL (THE NUMBER OF ANTENNAs × THE NUMBER OF TRANSMISSION STREAMS)

$\hat{G}_{ij}$ : THE CHANNEL MATRIX ESTIMATION VALUE BY REFERENCE SIGNAL $P_{ij}$ : TRANSMISSION POWER OF $j$-TH UE IN $i$-TH CELL $N_{Stream,ij}$ : THE NUMBER OF TRANSMISSION STREAMS OF $j$-TH UE IN $i$-TH CELL $\sigma_N^2$ : NOISE POWER $k$ : SUBCARRIER INDEX $l$ : OFDM SYMBOL INDEX

FIG.2

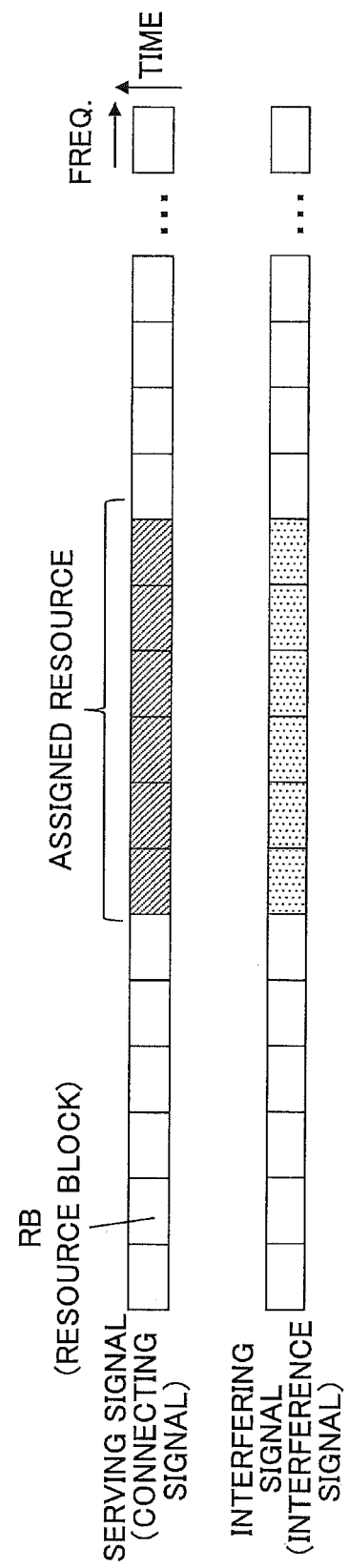

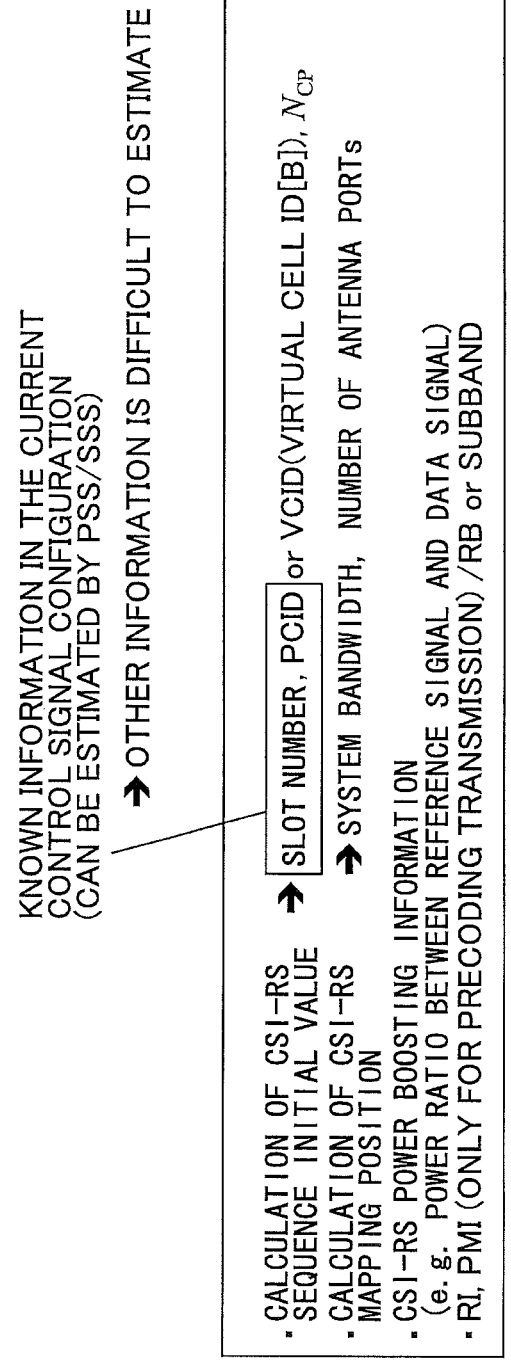

FIG.8

KNOWN INFORMATION IN THE CURRENT
CONTROL SIGNAL CONFIGURATION
(CAN BE ESTIMATED BY PSS/SSS)
→ OTHER INFORMATION IS DIFFICULT TO ESTIMATE

- CALCULATION OF DM-RS
  SEQUENCE INITIAL VALUE → SLOT NUMBER, PCID or VCID, $n_{SCID}$ (UE IDENTIFICATION NUMBER → 0 or 1)
  IN MU-MIMO
  PDSCH TRANSMISSION BANDWIDTH
- CALCULATION OF DM-RS
  MAPPING POSITION → $N_{CP}$, NUMBER OF ANTENNA PORTs/RB or SUBBAND
- DM-RS POWER BOOSTING INFORMATION/RB or SUBBAND
  (e.g. POWER RATIO BETWEEN REFERENCE SIGNAL AND DATA SIGNAL)
- RI/RB or SUBBAND

※ DM-RS IS TRANSMITTED BY BEING PRECODED ONLY
  IN RESOURCE WHERE USER IS ASSIGNED
  → PMI AND USER ASSIGNMENT INFORMATION ARE UNNECESSARY

FIG.9

- IT IS NECESSARY TO ESTIMATE COVARIANCE MATRIX INCLUDING ONLY INTERFERENCE NOISE COMPONENT FROM RECEIVED REFERENCE SIGNAL IN CONNECTING CELL $$W_{IRC} = \frac{P_{00}}{N_{Stream,00}} \hat{G}_{00}^H \left( \hat{G}_{00}(k,l) \hat{G}_{00}^H(k,l) + \boxed{\hat{R}_{I+N}} \right)^{-1}$$

⇒ MATRIX THAT NEEDS TO BE ESTIMATED $$R_{I+N}(k,l) = \sum_{i=1}^{N_{cell}-1} \sum_{j=1}^{N_{user}-1} \frac{P_{ij}}{N_{Stream,ij}} G_{ij}(k,l) G_{ij}^H(k,l) + \sigma_N^2 I$$

FORMED BY ONLY USER/CELL THAT BECOME INTERFERENCE

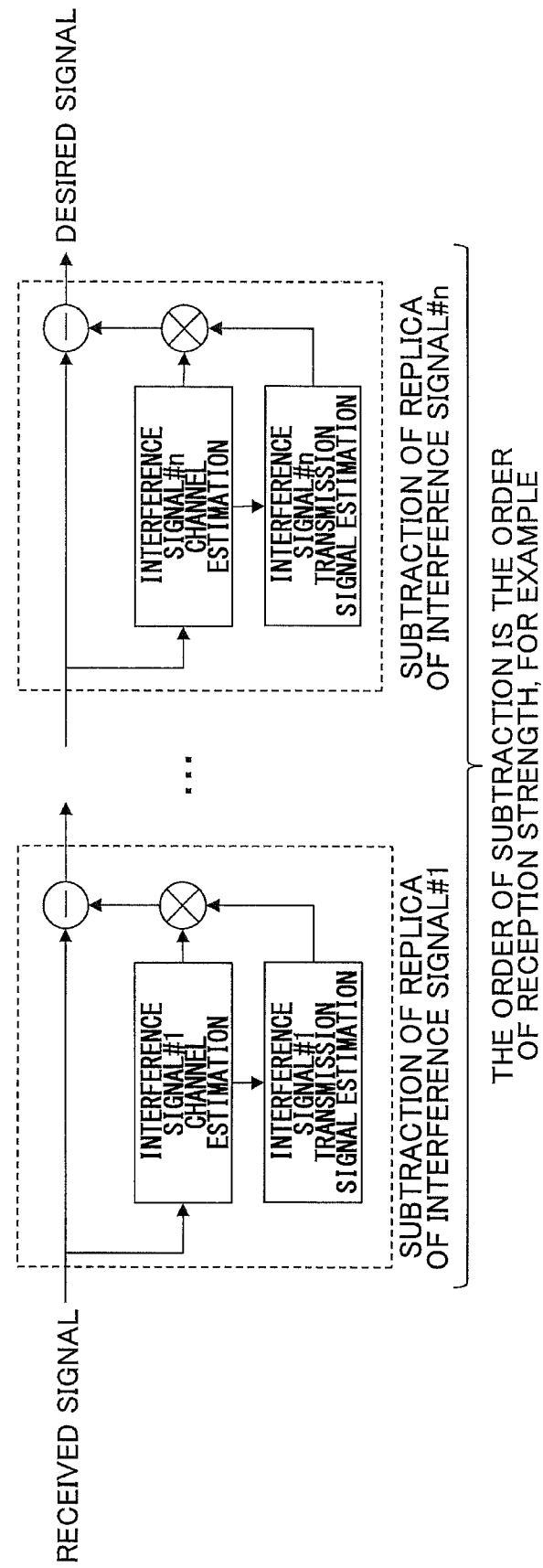

FIG.14

| INFORMATION ELEMENT |
|---|
| TM |
| PCID |
| NUMBER OF CRS ANTENNA PORTs |
| MBSFN CONFIG. |
| CRS POWER BOOSTING INFORMATION |
| SYSTEM BANDWIDTH |
| $N_{CP}$ |
| RI |
| PMI |
| USER ASSIGNMENT INFORMATION |

FIG.16

| | INFORMATION ELEMENT | |
|---|---|---|
| COMMON PART | TM | ESSENTIAL or ARBITRARY |
| | PCID or VCID | ARBITRARY (EXAMPLE: UNNECESSARY WHEN UNIFIED IN THE WHOLE SYSTEM) |
| | SLOT NUMBER | ESSENTIAL |
| | $N_{CP}$ | ARBITRARY (CAN BE ESTIMATED BY CURRENT PSS/SSS) |
| | RI | ARBITRARY (EXAMPLE: UNNECESSARY WHEN UNIFIED IN THE WHOLE SYSTEM) |
| | USER ASSIGNMENT INFORMATION | ARBITRARY (ALTHOUGH CHARACTERISTICs DETERIORATE IF NOT SEND, INFORMATION AMOUNT CAN BE DECREASED) |
| | | ESSENTIAL |
| CRS BASED | NUMBER OF CRS ANTENNA PORTs | ESSENTIAL |
| | MBSFN CONFIG. | ESSENTIAL |
| | SYSTEM BANDWIDTH | ESSENTIAL |
| | CRS POWER BOOSTING INFORMATION | ESSENTIAL |
| | PMI | ARBITRARY (ALTHOUGH CHARACTERISTICs DETERIORATE IF NOT SEND, INFORMATION AMOUNT CAN BE DECREASED) |
| CSI-RS BASED | NUMBER OF CSI-RS ANTENNA PORTs | ESSENTIAL |
| | SYSTEM BANDWIDTH | ESSENTIAL |
| | CSI-RS POWER BOOSTING INFORMATION | ESSENTIAL |
| | PMI | ARBITRARY (ALTHOUGH CHARACTERISTICs DETERIORATE IF NOT SEND, INFORMATION AMOUNT CAN BE DECREASED) |
| DM-RS BASED | $n_{SCID}$ | ARBITRARY (EXAMPLE: ALTHOUGH OPERATION IS POSSIBLE EVEN WHEN ALWAYS 0, CHARACTERISTICs DETERIORATE) |
| | NUMBER OF DM-RS ANTENNA PORTs | ESSENTIAL |
| | DM-RS POWER BOOSTING INFORMATION | ESSENTIAL |
| | PDSCH TRANSMISSION BANDWIDTH | ESSENTIAL |

FIG.17

| INFORMATION ELEMENT | NUMBER OF BITs | CONTENT |
|---|---|---|
| RESOURCE ALLOCATION HEADER | 1 | HEADER INDICATING WHICH IS USED, RESOURCE ALLOCATION TYPE 0 OR 1 |
| RESOURCE BLOCK ASSIGNMENT | $\left\lceil N_{RB}^{DL}/P \right\rceil$ | INDICATING ASSIGNED NUMBER OF RB AND ASSIGNED POSITION (P IS RBG SIZE, WHICH IS VARIABLE ACCORDING TO SYSTEM BANDWIDTH) |
| TPC COMMAND FOR PUCCH | 2 | TPC BIT APPLIED TO PUCCH TRANSMISSION |
| HARQ PROCCESS NUMBER | 3 | HARQ PROCCESS NUMBER (8 PROCCESSEs AT THE MAXIMUM IN LTE) |
| SCRAMBLING IDENTITY, RANK INDICATER, DM-RS PORT | 3 | JOINTLY ENCODING FOR SCID, RI, AND DM-RS PORT INDEX |
| MODULATION AND CODING SCHEME | 10 | MODULATION SCHEME AND CODING RATE, THAT IS, TBS |
| NEW DATA INDICATOR | 2 | FLAG INDICATING NEW or RETRANSMISSION (NEW IF TOGGLED FROM PREVIOUS TIME) |
| REDUNDANCY VERSION | 4 | INDICATING TRANSMITTED REDUNDANCY BIT PATTERN |

RANK1 TRANSMISSION IS ASSUMED,
AND LATTER HALF 5 BITs ARE REPLACED
→ SEND $n_{SCID}$, RI, DM-RS ANTENNA PORT AND
PMI OF MOST DOMINANT INTERFERENCE SIGNAL
※THE NUMBER OF BITs FOR PMI MAY BE DECREASED

FIG.24

| Value of 'PDSCH RE Mapping and Quasi-Co-Location Indicator' field | Description |
|---|---|
| 00 | Parameter set 1 configured by higher layers |
| 01 | Parameter set 2 configured by higher layers |
| 10 | Parameter set 3 configured by higher layers |
| 11 | Parameter set 4 configured by higher layers |

FIG.25

| | INFORMATION NECESSARY FOR IRC TYPE 1 | INFORMATION SENT BY RRC |
|---|---|---|
| CRS BASED | • PCID<br>• NUMBER OF CRS ANTENNA PORTs<br>• MBSFN CONFIG.<br>• CRS POWER BOOSTING INFORMATION<br>• SYSTEM BANDWIDTH<br>• $N_{cp}$<br>• RI, PMI (ONLY WHEN PRECODING TRANSMISSION) | • PCID<br>• NUMBER OF CRS ANTENNA PORTs<br>• MBSFN CONFIG.<br>• CRS POWER BOOSTING INFORMATION |
| CSI-RS BASED | • PCID or VCID<br>• NUMBER OF CSI-RS ANTENNA PORTs<br>• CSI-RS POWER BOOSTING INFORMATION<br>• SYSTEM BANDWIDTH<br>• $N_{cp}$<br>• RI, PMI (ONLY WHEN PRECODING TRANSMISSION) | • PCID and VCID<br>• NUMBER OF CSI-RS ANTENNA PORTs<br>• CSI-RS POWER BOOSTING INFORMATION<br>• LACKING INFORMATION |
| OTHER | • USER ASSIGNMENT INFORMATION | • PDSCH START SYMBOL |

FIG.26

| INFORMATION ELEMENT | NUMBER OF BITs | CONTENT |
|---|---|---|
| RESOURCE ALLOCATION HEADER | 1 | HEADER INDICATING WHICH IS USED, RESOURCE ALLOCATION TYPE 0 OR 1 |
| RESOURCE BLOCK ASSIGNMENT | | INDICATING ASSIGNED NUMBER OF RB AND ASSIGNED POSITION (P IS RBG SIZE, WHICH IS VARIABLE ACCORDING TO SYSTEM BANDWIDTH) |
| TPC COMMAND FOR PUCCH | 2 | TPC BIT APPLIED TO PUCCH TRANSMISSION |
| HARQ PROCCESS NUMBER | 3 | HARQ PROCESS NUMBER (8 PROCCESSEs AT THE MAXIMUM IN LTE) |
| SCRAMBLING IDENTITY, RANK INDICATER, DM-RS PORT | 3 | JOINTLY ENCODING FOR SCID, RI, AND DM-RS PORT INDEX |
| MODULATION AND CODING SCHEME | 10 | MODULATION SCHEME AND CODING RATE, THAT IS, TBS |
| NEW DATA INDICATOR | 2 | FLAG INDICATING NEW or RETRANSMISSION (NEW IF TOGGLED FROM PREVIOUS TIME) |
| REDUNDANCY VERSION | 4 | INDICATING TRANSMITTED REDUNDANCY BIT PATTERN |
| TP CONFIGURATION FOR QCL | 2 | TP CONFIGURATION IN QCL |

SINCE REPORTED BY RRC, REPLACED WITH GRANULARITY-REDUCED PMI (1BIT)

FIG.27

| INFORMATION ELEMENT | NUMBER OF BITs | CONTENT |
|---|---|---|
| RESOURCE ALLOCATION HEADER | 1 | HEADER INDICATING WHICH IS USED, RESOURCE ALLOCATION TYPE 0 OR 1 |
| RESOURCE BLOCK ASSIGNMENT | | INDICATING ASSIGNED NUMBER OF RB AND ASSIGNED POSITION (P IS RBG SIZE, WHICH IS VARIABLE ACCORDING TO SYSTEM BANDWIDTH) |
| TPC COMMAND FOR PUCCH | 2 | TPC BIT APPLIED TO PUCCH TRANSMISSION |
| HARQ PROCCESS NUMBER | 3 | HARQ PROCCESS NUMBER (8 PROCCESSes AT THE MAXIMUM IN LTE) |
| SCRAMBLING IDENTITY, RANK INDICATER, DM-RS PORT | 3 | JOINTLY ENCODING FOR SCID, RI, AND DM-RS PORT INDEX |
| MODULATION AND CODING SCHEME | 10 | MODULATION SCHEME AND CODING RATE, THAT IS, TBS |
| NEW DATA INDICATOR | 2 | FLAG INDICATING NEW or RETRANSMISSION (NEW IF TOGGLED FROM PREVIOUS TIME) |
| REDUNDANCY VERSION | 4 | INDICATING TRANSMITTED REDUNDANCY BIT PATTERN |
| TP CONFIGURATION FOR QCL | 2 | TP CONFIGURATION IN QCL |
| PMI AND RI | 12 (EXAMPLE) | PMI (1BIT) AND RI (3BIT) FOR ADJACENT 3 TPs WHERE GRANULARITY IS REDUCED (EXAMPLE) |

US 10,911,172 B2

USER APPARATUS, BASE STATION, INTERFERENCE REDUCING METHOD AND INTERFERENCE REDUCING CONTROL INFORMATION NOTIFICATION METHOD

CROSS-REFERENCE TO RELATED APPLICATIONS

This application is a national stage application of PCT/JP2013/076551 filed Sep. 30, 2013, which claims priority to Japanese Priority Application No. 2012-288896 filed on Dec. 28, 2012, the entire contents of which are hereby incorporated by reference.

TECHNICAL FIELD

The present invention relates to a base station and a user apparatus in a radio communication system.

RELATED ART

In LTE (Long Term Evolution) Advanced in 3GPP (Third Generation Partnership Project), OFDMA (Orthogonal Frequency Division Multiplexing Access) using MU-MIMO (multi-user multiple-input multiple-output) is proposed. In downlink transmission of MU-MIMO, one base station can communicate with a plurality of user apparatuses, and in addition to that, the base station can also transmit different data streams (layers) to one user apparatus at the same time.

Also, in the LTE-Advanced, in the downlink communication, various techniques are considered for reducing (suppressing, removing, for example), at the user apparatus, interference of an interference radio beam from an interference base station against a desired radio beam from a connecting base station, and interference of signals to other users at the connecting base station.

In the technique for reducing such interferences, for example, as shown in FIG. 1, in a case where a user apparatus 10 resides near a border of a connecting cell (cell of a connecting base station 1, serving cell), so the user apparatus 10 strongly receives an interference radio beam from another base station 2 (interference base station) adjacent to the desired base station 1, the user apparatus 10 can improve reception quality of the desired signal carried on a desired radio beam by performing interference reduction processing. In FIG. 1, a beam generated by the interference base station 2, that is, a part of beams for a downlink channel to other user apparatus (user apparatus 11, for example) becomes an interference signal for the user apparatus 10. FIG. 1 especially shows interference from an interference cell.

RELATED ART DOCUMENT

Non-Patent Document

Non-Patent Document 1: 3GPP, R1-124010, Section 6.10.5.1
Non-Patent Document 2: P. Hoeher et. al., "Two-dimensional pilot-symbol-aided channel estimation by Wiener filtering," Proc. ICASSP'97, 1997
Non-Patent Document 3: 3GPP, R1-111562, Renesas Mobile Europe Ltd., May 2011.
Non-Patent Document 4: Axnas J. et. al., "Successive Interference Cancellation Techniques for LTE Downlink," PIMRC 2011.
Non-Patent Document 5: 3GPP, R1-125353
Non-Patent Document 6: 3GPP, R1-124669

SUMMARY

In the following, outlines of techniques for interference reduction such as interference suppression and removing and the like in a conventional technique are described.

<Interference Rejection Combining Reception>

There is a technique called Interference Rejection Combining as one of techniques for separate a desired signal from a received signal that includes an interference signal and the desired signal to obtain the desired signal. The interference rejection combining (IRC) is a technique for weighting (reception weights) signals that are obtained by each reception antenna in the user apparatus so as to suppress, in the user apparatus, interference of the interference radio beam from the interference base station against the desired radio beam from the connecting base station, and the interference by signals for other users at the connecting base station in the downlink communication. For example, in the case shown in FIG. 1, the user apparatus 10 performs directivity control (weight control) to direct a beam to a desired signal from the connecting base station 1, and direct null to an interference signal from the interference base station 2 so as to perform interference rejection.

As shown in FIG. 2, in the IRC reception technique, there are two types (Type 1, Type 2) of methods for calculating reception weights, which are a type for a case where the channel of the interference signal can be estimated, and a type for a case where the estimation of the channel of the interference signal is impossible. By the way, each of the equations shown in FIG. 2 is an equation derived from an MMSE (Minimum Mean. Squared Error) algorithm. Also, the technique for calculating reception weights using these equations is an existing technique in itself.

As shown in FIG. 2, in the equation of Type 1 for the case where channel estimation of the interference signal is possible, the underlined part is a covariance matrix formed by a channel matrix of the interference cell. Also, in the equation of Type 2 for case where channel estimation of the interference signal is impossible, the underlined part is a covariance matrix (statistical amount) of noise interference components estimated by a received signal from the connecting cell (cell formed by the connecting base station, a serving cell).

<Information necessary for IRC Type 1>

For generating IRC reception weights in IRC Type 1, a channel matrix for the interference signal is necessary in addition to channel information of the desired signal. The channel matrix can be obtained by estimating a channel by using a reference signal from the interference cell. In a case where precoding transmission is performed in the base station side, the channel matrix needs to be a channel matrix of a channel to which precoding has been applied (multiplied by a precoding matrix).

In the LTE-Advanced, as reference signals that can be used for channel estimation, there are CRS (Cell-specific Reference Signal), CSI-RS (CSI Reference Signal), and DM-RS (DeModulation Reference Signal, or UE specific Reference Signal).

Since CRS is transmitted in any TM (Transmission Mode), channel estimation by CRS is possible for any TM. However, since precoding transmission is not performed for CRS, only channel estimation without precoding information (PMI: Precoding Matrix Identifier) is possible. That is, when preceding transmission is performed in the base station side, PMI is separately necessary for obtaining a target channel matrix.

TM (Transmission Mode) is a transmission mode in multiple antenna transmission in LTE. Configurations of reference signals and presence or absence of precoding are different for each TM. For example, TM3 is for closed loop type transmission diversity (no precoding) in which data is demodulated by using CRS. TM4 is for closed loop type transmission diversity (precoding is performed) in which data is demodulated by using CRS. TM9 is for space multiplexing (there is precoding) in which data is demodulated by using DM-RS.

CSI-RS (CSI Reference Signal) is a reference signal for channel quality measurement introduced from Rel.10 of LTE (TM9 is introduced in Rel.10). CSI-RS is multiplexed for each antennal for transmission. CRS transmission from the base station supports up to four transmission antennas (4 layer multiplexing) at the maximum. On the other hand, CSI-RS supports eight transmission antennas (eight layer multiplexing) at the maximum. For example, in a case where the base station (eNodeB) performs eight antenna transmission, channel estimation is performed using CSI-RS. Also, in a case where Antenna Virtualization of CRS (decreasing the number of antennas for transmitting CRS in order to reduce density of reference signals) is applied, when channel estimation by CRS cannot be performed for all antennas, channel estimation is performed using CSI-RS. As is the case of CRS, since precoding transmission is not performed for CSI-RS, only channel estimation without PMI is possible. That is, if precoding transmission is performed in the base station side, PMI is necessary for obtaining the target channel matrix.

DM-RS is a demodulation reference signal for PDSCH (Physical Downlink Shared Channel, channel for carrying data signal to UEs), and DM-RS is precoded and transmitted like a signal of the PDSCH. Therefore, by performing channel estimation using DM-RS, a channel with precoding information (PMI) can be directly estimated.

In a case where the channel matrix is obtained by performing channel estimation for the interference signal using CRS or CSI-RS, user assignment information in the interference signal is necessary in addition to the channel matrix in order to generate IRC reception weights in Type 1. The reason is as follows.

For a user apparatus in a connecting cell, when a user is assigned to PDSCH in an interference cell, the signal of the PDSCH becomes an interference signal. Therefore, a user apparatus performing IRC calculates IRC weights so as to direct null only to the interference signal (signal of PDSCH) that is assigned to a user.

That is, as shown in FIG. 3, a signal from the interference cell at a resource the same as a resource assigned to the user apparatus for data reception in the connecting cell becomes an interference signal. Thus, in order to suppress the interference signal, resource assignment information to a user for the interference signal is necessary.

However, since CRS and CSI-RS are transmitted by the whole band irrespective of presence or absence of user assignment, user assignment information cannot be obtained from CRS or CSI-RS. Thus, user assignment information is separately necessary.

On the other hand, since DM-RS is transmitted only by a resource assigned to a user, the resource in itself by which DM-RS is received becomes user assignment information. Thus, user assignment information is not necessary separately.

In the following, necessary information for performing channel estimation using each reference signal is described in more detail while explaining an outline of the channel estimation processing for IRC weight calculation in the user apparatus with reference to a flowchart of FIG. 4. In the explanation, it is assumed that precoding transmission is performed in the base station side.

First, the user apparatus determines a reference signal on which channel estimation is performed (step 101). TM is necessary in this step. However, in a case where TM can be known by a certain method, or where the same TM is used in the whole system, it is not necessary to obtain TM. In the after-mentioned embodiments, explanation is given by especially focusing on necessary information for performing channel estimation using a reference signal that is determined for the channel estimation.

In step 102, calculation of a sequence initial value for the transmitted reference signal is performed. When the reference signal is CRS, PCID (Physical Cell ID), slot number, $N_{CP}$, and MBSFN configuration are necessary for calculating the sequence initial value. $N_{CP}$ is a value indicating whether CP (Cyclic Prefix) length is Normal or Extended, and is 0 or 1. When the reference signal is CSI-RS, slot number, PCID or VCID (Virtual Cell ID), and $N_{CP}$ are necessary. VCID is defined in the non-patent document 1. Also, when the reference signal is DM-RS, slot number, PCID or VCID (Virtual Cell ID), and $n_{SCID}$ and PDSCH transmission bandwidth are necessary, wherein $n_{SCID}$ is an identification number of a scramble sequence in MU-MIMO, and is 0 or 1.

In step 103, a scrambling sequence is calculated from the sequence initial value calculated in step 102. By steps 102 and 103, the reference signal sequence that is transmitted is specified.

In step 104, a resource on which the reference signal is mapped is specified. In this step, when the reference signal is CRS, system bandwidth, number of antenna ports, and MBSFN configuration become necessary. When the reference signal is CSI-RS, system bandwidth and number of antenna ports are necessary. When the reference signal is DM-RS, $N_{CP}$ and number of antenna ports for each RB or for each subband are necessary.

Mapping of the reference signal is defined according to the above-mentioned information such as the system bandwidth and the number antenna ports. Thus, the above-mentioned information is necessary. FIG. 5 shows a mapping example of CRS in the case of layer number 1.

Returning to FIG. 4, in step 105, channel estimation for the reference signal is performed. Here, for any of the reference signals, when power boosting is applied, it is necessary to correct it. Thus, power boosting information is necessary. The power boosting information is a power ratio between a reference signal and a data signal, for example.

In step 106, channel estimation for the whole resource is performed based on the estimation result obtained in step 105. In this step, for example, a two-dimensional MMSE channel estimation filter described in the non-patent document 2 is used.

In step 107, multiplication by the precoding matrix (represented as PMI) is performed. Therefore, in this step, in the cases of CRS and CSI-RS, PMI is necessary. In the case of DM-RS, by performing the processes until step 106, channel estimation including precoding information has been performed, thus, step 107, that is, PMI is unnecessary.

FIGS. 6-8 show summaries of necessary information for performing channel estimation as mentioned above. FIG. 6 shows necessary information for performing channel estimation using CRS, FIG. 7 shows necessary information for performing channel estimation using CSI-RS, and FIG. 8 shows necessary information for performing channel estimation using DM-RS.

As shown in FIGS. 6-8, in the pieces of necessary information for performing channel estimation, pieces of information other than PCID and slot number are difficult for the user apparatus to estimate.

<Necessary Information for IRC Type 2>

Next, necessary information for IRC Type 2 is described. As shown in FIG. 9, in Type 2, it is necessary to estimate the covariance matrix including only interference noise components from the received reference signal of the connecting cell. Estimating the covariance matrix in itself is a conventional technique. For example, by using a technique described in the non-patent document 3, it is possible to estimate the covariance matrix including only interference noise component from the received reference signal.

<Successive Interference Cancellation>

In addition to IRC, there is a technique of successive interference cancellation (SIC) as a technique for separating a desired signal from a received signal including an interference signal and the desired signal.

The successive interference cancellation is a technique for generating a replica signal by performing hard decision or soft decision for the interference signal from the received signal, and successively subtracting (removing) the replica signal from the received signal so as to extract a desired signal. A functional block diagram is shown in FIG. 10 when the user apparatus performs the successive interference cancellation. As shown in FIG. 10, for each of a plurality of interference signals, the user apparatus performs channel estimation of the interference signal, demodulates the interference signal based on the channel estimation, generates a replica of the interference signal, and successively subtracts the interference signal from the received signal. This configuration is merely an example for performing successive interference cancellation. For example, as shown in FIG. 11, a configuration may be adopted for performing successive interference cancellation using turbo equalization. The configuration shown in FIG. 11 is a configuration described in the non-patent document 4. Also, the configuration shown in FIG. 11 is an example of a configuration using the turbo equalization.

The configuration of the successive interference cancellation in itself is a conventional technique. The present invention can be applied to any successive interference canceller, irrespective of the scheme, as long as it includes a function for performing channel estimation of the interference cell and performing demodulation of the interference signal.

<Necessary Information for SIC>

As mentioned above, in order to perform successive interference cancellation, it is necessary to generate a replica signal for every interference signal. For achieving this, first, information for performing channel estimation for each interference signal is necessary. This information is the same as the information necessary for the before-mentioned IRC Type 1.

Next, for demodulation of the interference signal, information shown in FIG. 12 is necessary. That is, PDSCH modulation scheme for each RB or for each subband, configuration information for each of CRS/CSI-RS/DM-RS, MBSFN configuration and PDSCH start symbol are necessary as information for demodulation of the interference signal. In the case of using the turbo equalization, coding rate information for each RB or each subband is also necessary.

In the above-mentioned pieces of information, configuration for each of CRS/CSI-RS/DM-RS and MBSFN configuration are necessary information for calculating a resource on which the reference signal is mapped, and PDSCH start symbol is necessary information for calculating a resource on which PDSCH is mapped.

In the conventional technique, the necessary information for demodulation of the interference signal shown in FIG. 12 is not sent to the user apparatus.

As mentioned above, in the present control signal configuration of the LTE-Advanced, there is a shortage of information in the user apparatus for performing IRC Type 1 and the successive interference cancellation (SIC) by which interference reduction ability is high. Thus, it is difficult for the user apparatus to perform IRC Type 1 and the successive interference cancellation (SIC). Although it is possible to perform IRC type 2 in the present control signal configuration, there is a possibility that the interference reduction ability is inferior to that of Type 1.

That is, in the conventional technique, there is a problem in that it is difficult to provide the user apparatus with high interference reduction ability.

The present invention is contrived in view of the above-mentioned points, and an object of the present invention is to enable the user apparatus to have high interference reduction ability.

One or more embodiments of the present invention is configured as a user apparatus in a radio communication system including a plurality of base stations, including:

reception means that receives, from a connecting base station, control information to be used for reducing an interference signal sent from an interference base station for the user apparatus; and interference reducing means that reduces the interference signal by using the control information to obtain a desired signal sent from the connecting base station.

The reception means can be configured to receive the control information as downlink control information that is transmitted by a downlink physical layer signaling channel from the connecting base station, or, receive the control information by RRC signaling from the connecting base station.

The downlink control information includes predetermined information based on a predetermined format, and a part of information in the predetermined information is replaced with a part of the control information in the downlink control information received from the connecting base station, and wherein in a case where the control information is received as the downlink control information, the interference reducing means may be configured to use the replaced information as the part of the control information.

The user apparatus may include estimation means that estimates, in the control information to be used for reducing the interference signal, precoding information that is a part of control information used for channel estimation of the interference signal by using a received signal at a resource for receiving a zero power reference signal.

The interference reducing means is means that performs interference rejection combining reception based on channel estimation of an interference signal, or, means that performs successive interference cancellation.

Also, the present invention can be configured as a base station connecting with a user apparatus in a radio communication system, including:

reception means that receives, from an interference base station, control information to be used by the user apparatus for reducing an interference signal sent from the interference base station for the user apparatus; and transmission means that transmits the control information to the user apparatus as downlink control information by a downlink physical layer signaling channel, or, transmits the control information to the user apparatus by RRC signaling.

The downlink control information includes predetermined information based on a predetermined format, and, in a case where the transmission means transmits the control information to the user apparatus as the downlink control information, the transmission means may be configured to replace a part of information in the predetermined information in the downlink control information with a part of the control information so as to transmit the downlink control information where replacement is performed to the user apparatus.

The control information is, for example, information to be used by the user apparatus for performing interference rejection combining reception based on channel estimation of an interference signal, or, the control information is information to be used by the user apparatus for performing successive interference cancellation.

Also, the present invention may be configured as an interference reducing method executed by the user apparatus, and interference reducing control information notification method executed by the base station.

According to one or more embodiments of the present invention, it becomes possible to provide a technique to enable the user apparatus to have high interference reduction ability.

BRIEF DESCRIPTION OF THE DRAWINGS

FIG. 2 is a diagram for explaining interference rejection combining (IRC) reception;

FIG. 3 is a diagram for explaining an interference signal;

FIG. 7 is a diagram showing necessary information for performing channel estimation by using CSI-RS;

FIG. 8 is a diagram showing necessary information for performing channel estimation by using DM-RS;

FIG. 9 is a diagram showing necessary information for IRC Type2;

FIG. 10 is a block diagram showing a functional configuration example of a user apparatus that performs SIC;

FIG. 14 is a diagram of showing a DCI format example in an example 1-1;

FIG. 16 is a diagram showing information that should be included in DCI, and information for which inclusion in DCI may not be necessary (arbitrary);

FIG. 17 is a diagram for explaining an example of replacement in an example 1-2;

FIG. 24 is a diagram showing information sent by physical layer signaling in Quasi Co-location;

FIG. 25 is a diagram showing information for each TP that is transmitted by RRC signaling from a connecting base station in Quasi Co-location and the like, and information necessary for IRC Type1 by comparing them;

FIG. 26 is a diagram for explaining an example of replacement in an example 2-2;

FIG. 27 is a diagram for explaining an example of addition of information in an example 2-3;

DETAILED DESCRIPTION

In the following, embodiments of the present invention are described with reference to figures. The embodiments described below are merely examples, and the embodiments to which the present invention is applied are not limited to the embodiments below.

Outline of the Embodiment

As mentioned above, in the present control signal configuration of the LTE-Advanced, there is a shortage of information in the user apparatus for performing IRC Type 1 and successive interference cancellation (SIC) by which interference reduction ability is high. Thus, it is difficult for the user apparatus to perform IRC Type 1 and successive interference cancellation (SIC). Although it is possible to perform IRC type 2 in the present control signal configuration, there is a possibility that the interference reduction ability is inferior to that of Type 1. That is, in the conventional technique, it is difficult to perform channel estimation for the interference signal with high accuracy.

For improving the interference reduction ability of IRC type 2, it is necessary to accurately estimate the covariance matrix including only interference noise components.

As techniques for solving the above-mentioned problems, first, an embodiment is described as a first embodiment in which, basically, in order to perform IRC type 1, information for performing channel estimation for the interference signal in the user apparatus is dynamically sent from the NW side. Next, an embodiment is described as a second embodiment in which, basically, in order to perform IRC type 1, information for performing channel estimation for the interference signal in the user apparatus is semi-statically sent from the NW side.

Also, an embodiment is described as a third embodiment in which, basically, necessary information for enabling operation of SIC is sent from the NW side. Then, an embodiment is described as a fourth embodiment for estimating, in high accuracy, the covariance matrix of the interference signal component that is necessary for IRC type 2 by using existing control signals.

In each embodiment described blow, as to PMI as one of pieces of information for performing channel estimation, PMI is necessary when precoding transmission is performed in the base station side, and PMI is unnecessary when precoding transmission is not performed.

First Embodiment

Figure 13:
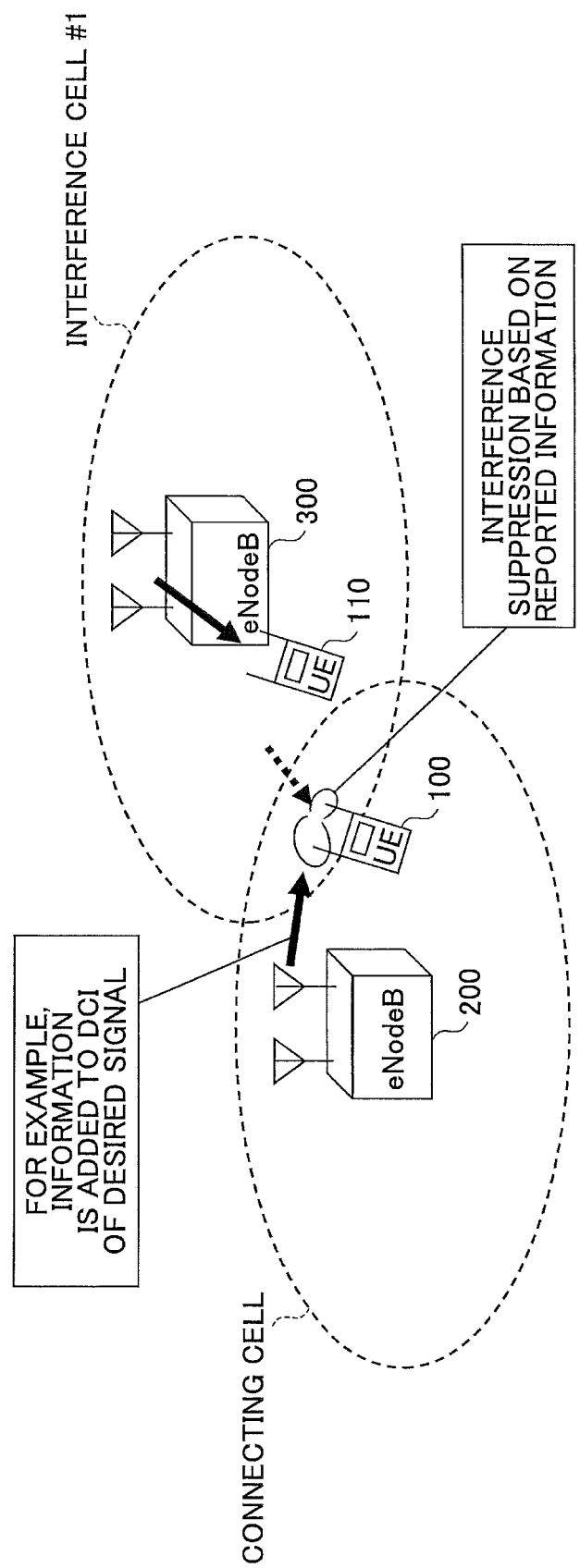
FIG. 13 is a schematic block diagram of a radio communication system of an embodiment of the present invention.

FIG. 13 shows a schematic block diagram of a radio communication system of the present embodiment. The system of the present embodiment is a radio communication system of the LTE-Advanced scheme, for example, in which a base station 200 (eNodeB) (connecting base station) forms a connecting cell, and a user apparatus 100 (UE) in the cell performs communication with the connecting base station 200 by a desired signal. The radio communication system of the present embodiment includes at least functions defined in the LTE-Advanced. But, the present invention is not limited to the scheme of the LTE-Advanced, and the present invention can be applied also to radio communication systems of the future generation of LTE-Advanced, and to schemes other than LTE.

Normally, the radio communication system is provided with many base stations. However, FIG. 13 only shows the connecting base station 200 and the base station 300 adjacent to the connecting base station 200. This adjacent base station 300 also forms a cell to perform signal transmission and reception with a user apparatus for which the base station 300 is a connecting base station. A signal transmitted from the adjacent base station 300 to the user apparatus 110 for which the base station 300 is a connecting base station becomes an interference signal for the user apparatus 100. Therefore, in the present embodiment, the adjacent base station 300 is called an interference base station. Also, a cell of the interference base station 300 is called an interference cell. Although, in general, there are a plurality of interference base stations for a connecting base station, FIG. 13 shows only one interference base station.

Figure 1:
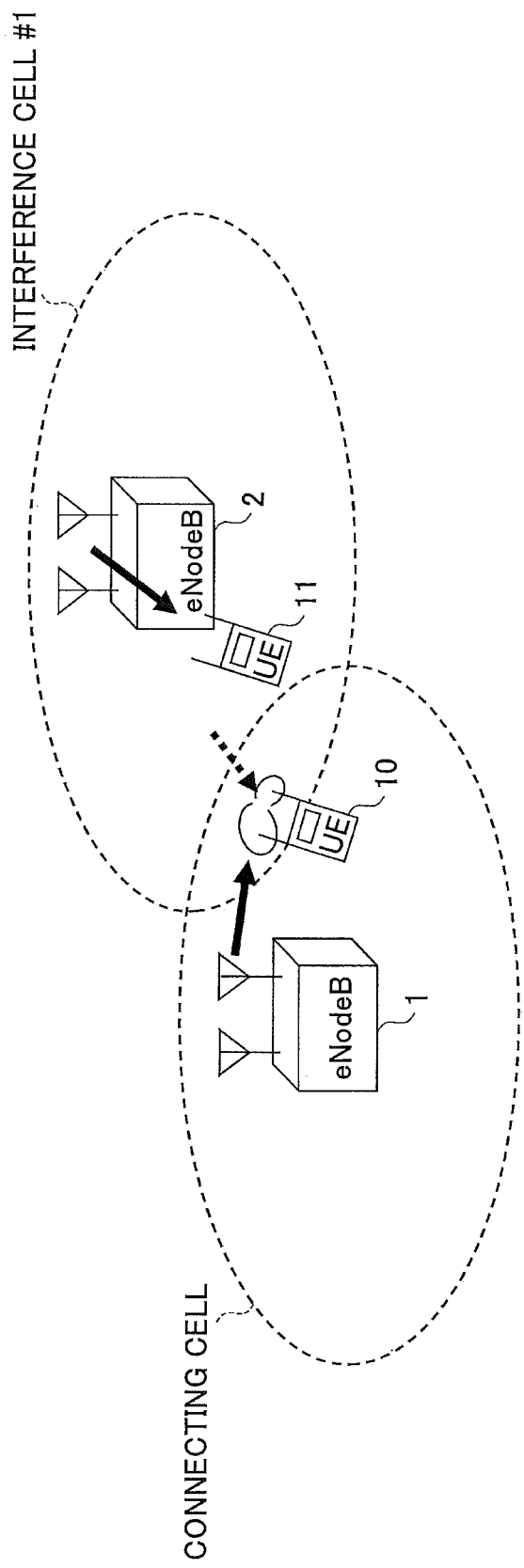
FIG. 1 is a diagram for explaining reduction of interference from an interference cell.
Figure 4:
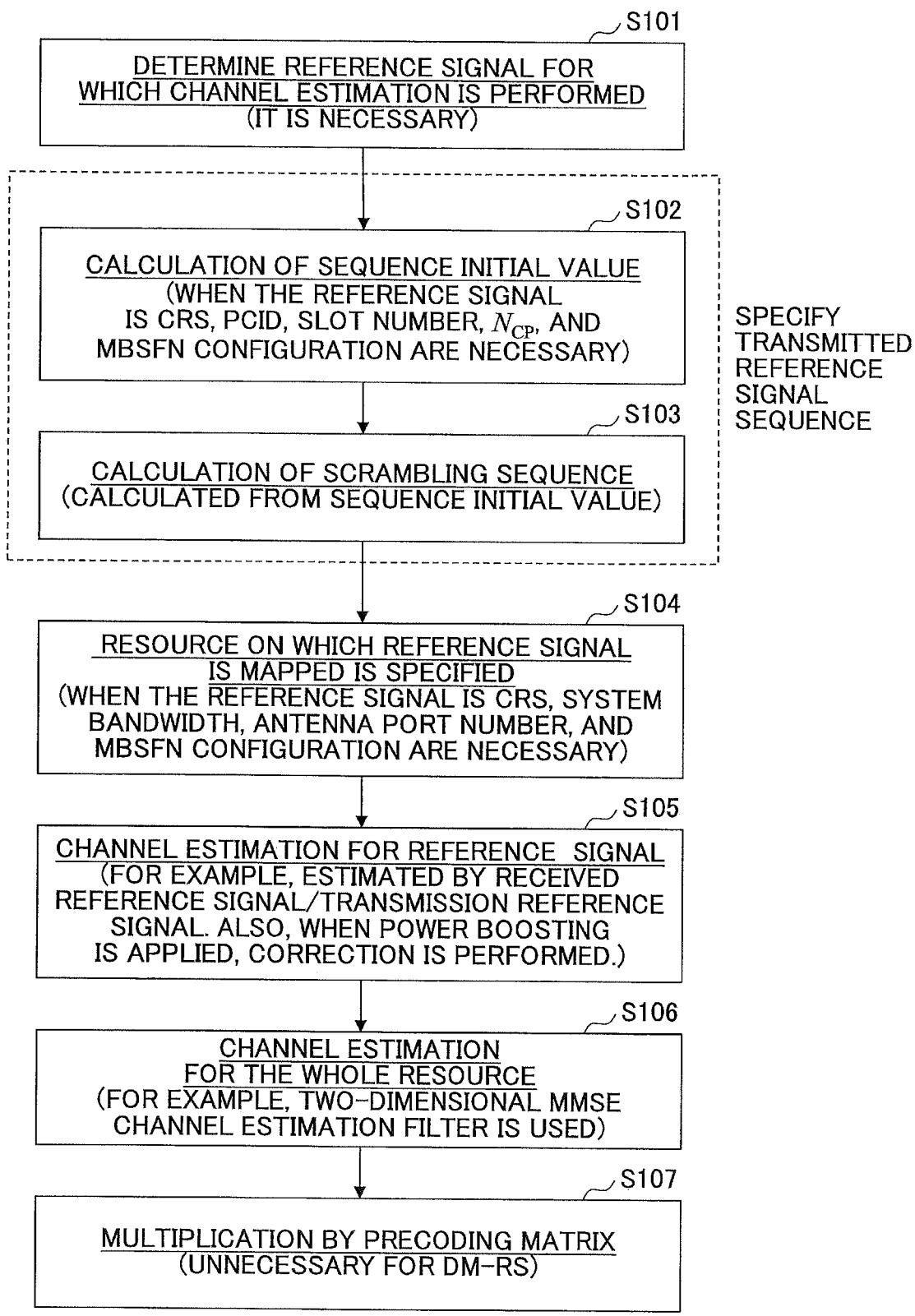
FIG. 4 is a flowchart for explaining an outline of channel estimation processing for IRC weight calculation.
Figure 5:
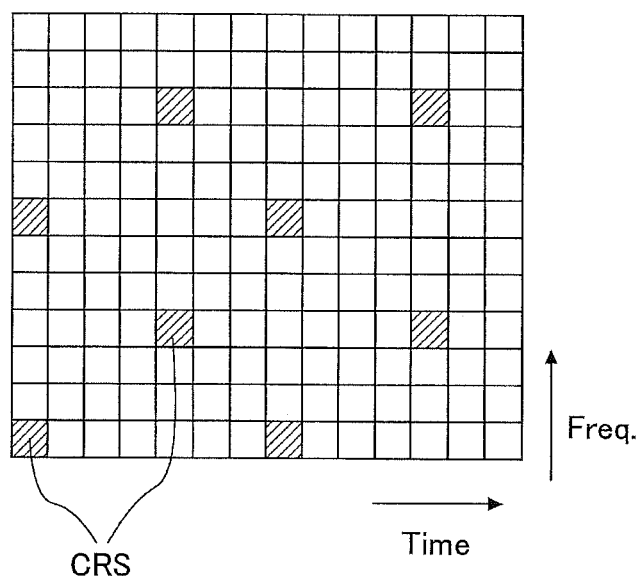
FIG. 5 is a diagram showing a mapping example of CRS.
Figure 6:
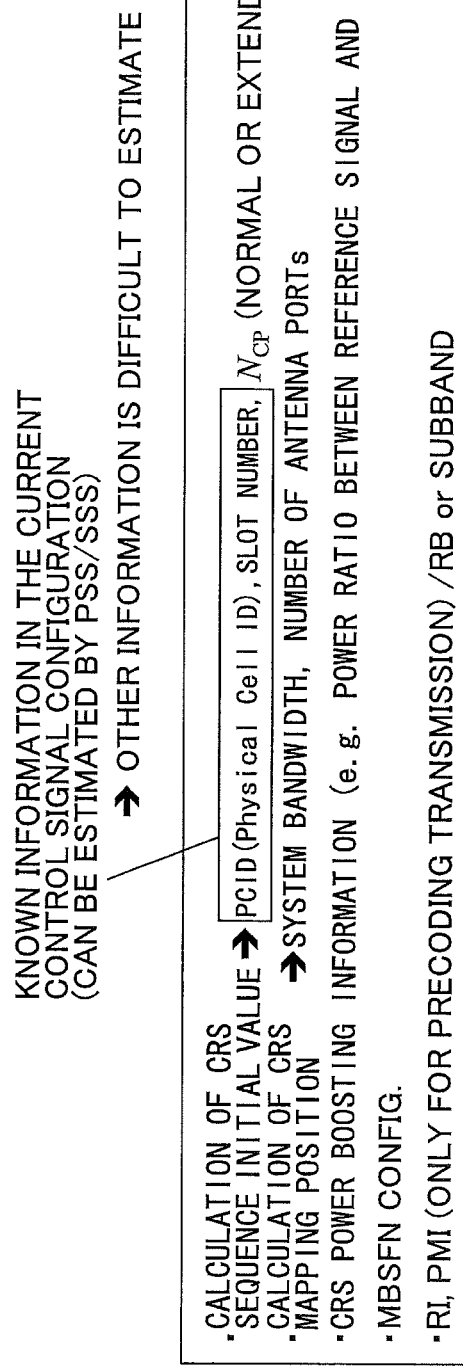
FIG. 6 is a diagram showing necessary information for performing channel estimation by using CRS.
Figure 11:
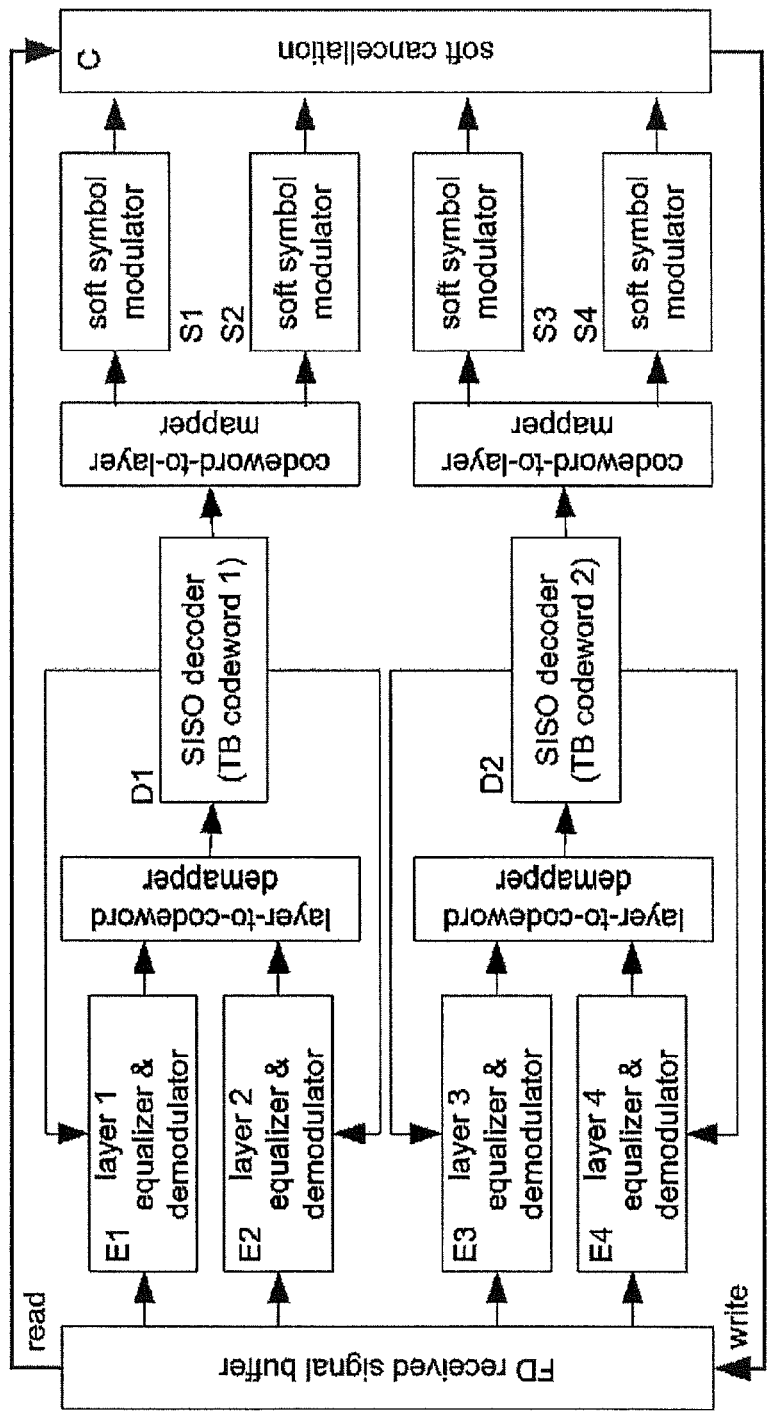
FIG. 11 is a block diagram showing a functional configuration example of SIC using turbo equalization.

In the first embodiment, as shown in FIG. 13, basically, the connecting base station 200 dynamically sends, to the user apparatus 100, information necessary for performing IRC type 1 by using a channel for transmitting a physical layer control signal. The channel for transmitting the physical layer control signal is PDCCH (physical downlink control channel), for example. The control signal transmitted by the channel is downlink control information (DCI). The information necessary for IRC Type 1 is information described with reference to FIGS. 6-8, and the like, that is, information necessary for channel estimation of the interference signal and user assignment information of the interference signal. In the following, there is a case in which the information necessary for executing the IRC Type 1 is called IRC Type 1 necessary information.

In the following, the first embodiment is described using more concrete examples. Apparatus configurations (functional block) and operation based on the configurations are described after explaining each example.

Example 1-1

In the example 1-1, basically, the connecting base station 200 sends, to the user apparatus 100, all pieces of information necessary for executing IRC Type 1 by PDCCH (Physical downlink control channel). That is, the connecting base station 200 describes IRC Type 1 necessary information in a format of DCI (Downlink Control Information), and sends the DCI to the user apparatus 100 by the PDCCH.

The method for the connecting base station 200 to determine interference cells for the user apparatus 100 is not limited to a particular method in the present invention. For example, the interference cell may be specified by received quality information from the user apparatus 100, or the interference cell may, be specified by exchanging assignment information and the like between base stations.

Figure 15:
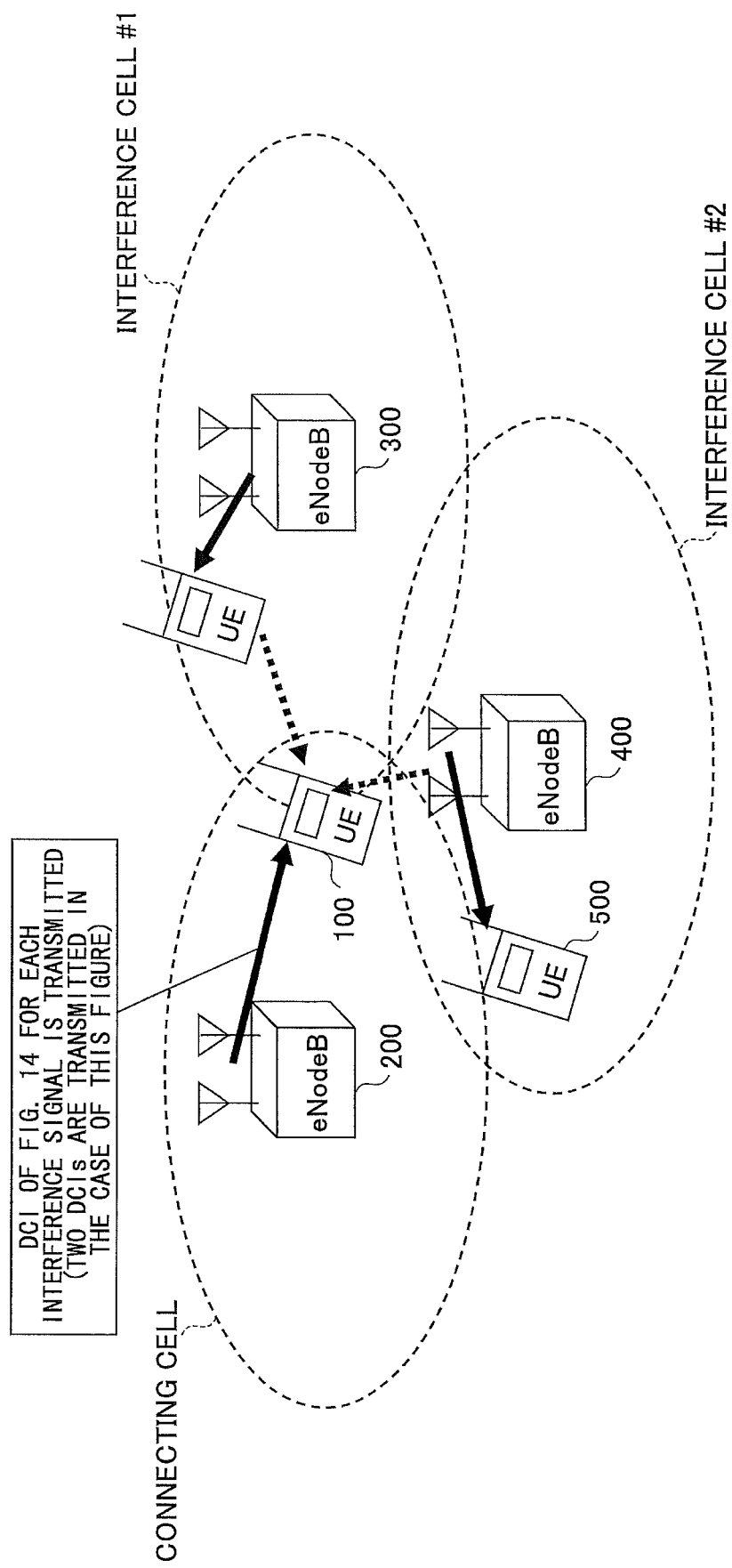
FIG. 15 is a diagram for explaining processing in the example 1-1.

In the example 1-1, a case where channel estimation is performed by CRS is described with reference to FIGS. 14 and 15. In this example, as shown in FIG. 14, DCI in which IRC Type 1 necessary information is described is sent from the connecting base station 200 to the user apparatus 100 as shown in FIG. 15. As shown in FIG. 15, in this example, there are two interference cells (interference cell #1 and interference cell #2) for the user apparatus 100. Thus, two pieces of the IRC Type 1 necessary information are sent to the user apparatus 100. In the case where the connecting base station 200 sends two pieces of IRC Type 1 necessary information to the user apparatus 100, two pieces of information for the two interference cells may be described in the DCI format shown in FIG. 14 for each information element, or, IRC Type 1 necessary information for one interference cell is described in the DCI format shown in FIG. 14, and DCI of the same format as the DCI shown in FIG. 14 may be added, next to the last information (user assignment information), as IRC Type 1 necessary information of the second interference cell.

FIGS. 14 and 15 show the case of using CRS. Also as to CSI-RS and DM-RS, the IRC Type 1 necessary information can be sent in the same way like CRS except for change of the content of information.

In the example 1-1, instead of sending by PDCCH all pieces of information necessary for executing IRC Type 1 by describing the information in DCI, a part of pieces of information necessary for executing IRC Type 1 may be sent by PDCCH by describing the part of the information in DCI. The reason is that, as to predetermined information in the IRC Type 1 necessary information described in FIGS. 6-8, IRC Type 1 can be performed without sending the predetermined of information.

FIG. 16 shows information that should be included in DCI and information that may not be included (may be arbitrarily included) in the Example 1-1. FIG. 16 shows information by separating it into a part common to each reference signal and a part specific for each reference signal.

As shown in FIG. 16, in any reference signal, PCID or VCID and user assignment information are essential. In channel estimation using CRS, number of CRS antenna ports, MBSFN configuration, system bandwidth, CRS power boosting information are essential. In channel estimation using CSI-RS, number of CSI-RS antenna ports, system bandwidth, CSI-RS power boosting information are essential. In channel estimation using DM-RS, number of DM-RS antenna ports, DM-RS power boosting information, PDSCH transmission bandwidth are essential.

In information shown in FIG. 16, pieces of information other than those described above can be arbitrarily used. Even though these pieces of information are not included, IRC Type 1 can be executed. The content shown in FIG. 16 applies to all of embodiments for performing channel estimation of the interference signal.

Example 1-2

In the example 1-2, the connecting base station 100 replaces a part or all of pieces of downlink control information described in DCI of LTE-Advanced with information necessary for executing IRC Type1, and sends the DCI in which information is replaced to the user apparatus 100 by the PDCCH. Then, the user apparatus 100 extracts the replaced prices of information from information in the DCI as information necessary for executing IRC Type1, and uses the information for executing IRC Type 1. That is, the user apparatus 100 reads and uses downlink control information at the replacing target position in the DCI as IRC Type 1 necessary information.

The replacement is performed by using free bits in a plurality of bits corresponding to the original downlink control information, for example. Also, in DCI, downlink control information that causes no trouble even if this is not sent may be replaced with IRC Type1 necessary information. The downlink control information that causes no trouble even if this is not sent is, for example, downlink control information that has been sent to the user apparatus 100 by a control signal other than the DCI, downlink control information of which transmission frequency may be low, and the like. As to the downlink control information of which transmission frequency may be low, the downlink control information is replaced with IRC Type 1 necessary information every predetermined number of subframes, for example.

Compared to the example 1-1, there is an advantage in the example 1-2 in that IRC Type 1 can be realized without increase of overhead. But, there is a limit in the amount of information that can be transmitted. Thus, in a case where all of pieces of information necessary for executing IRC Type 1 cannot be sent by the replacement, the user apparatus 100 obtains information, other than the information sent by the replacement, using another method. This method is described later.

An example of replacement in the example 1-2 is described with reference to FIG. 17. FIG. 17 shows DCI format 2C for TM9. In this example, RANK1 transmission is assumed so that 5 bits of the latter half of 10 bits corresponding to an information element of the modulation scheme and the coding rate are replaced with IRC Type1 necessary information. In the 10 bits corresponding to the information element of the modulation scheme and the coding rate, information of the first stream is described in 5 bits of the first half, and information of the second stream is described in 5 bits of the latter half. But, since the RANK1 transmission uses only 1 stream, the 5 bits of the latter half are not used. Thus, in this example, the IRC Type1 necessary information is described in the 5 bits of the latter half. In this example, pieces of the IRC Type1 necessary information in this case are $n_{SCID}$, RI, DM-RS antenna port and PMI of the most dominant interference signal. As to PMI, the number of bits may be decreased. An example for decreasing the number of bits of PMI is described later.

Generally, IRC is effective when the user apparatus 100 is positioned at a cell edge where interference from an interference cell is large. In such a case, it is assumed that the number of transmission layer (RANK) is controlled to be 1 by rank adaptation. Thus, as mentioned above, RANK1 transmission is assumed.

Example 1-3

Figure 18:
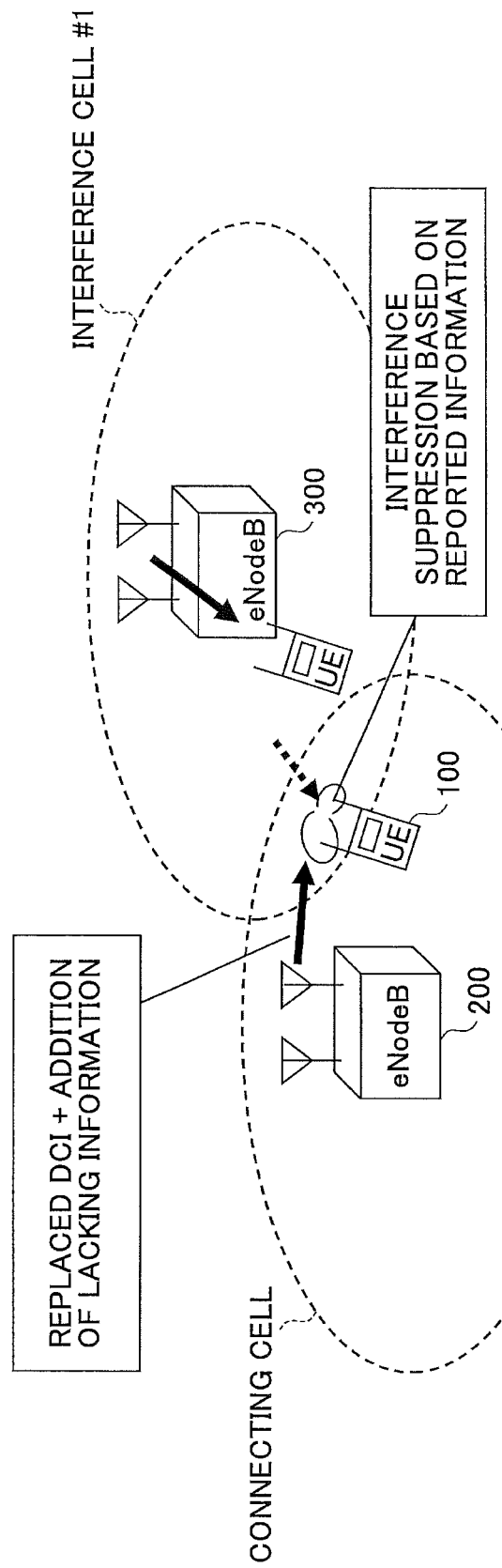
FIG. 18 is a diagram for explaining processes in an example 1-3.

In the example 1-3, replacement of downlink control information in DCI with the IRC Type 1 necessary information is performed as described in the example 1-2, and also, lacking information is sent additionally. That is, as shown in FIG. 18, the connecting base station 200 adds lacking information to the DCI where downlink control information is replaced with IRC Type 1 necessary information, and sends the DCI to which the lacking information is added to the user apparatus 100 using PDCCH. The user apparatus 100 executes IRC Type 1 using the information that is sent. Here, as to addition of the lacking information, for example, the DCI format is extended so that the lacking information is added to the extended part, and the DCI including the replaced information and the extended information is sent.

In the example 1-3, compared to the case where IRC Type 1 necessary information is sent by DCI without replacement, overhead becomes small.

Example 1-4

The example 1-4 can be applied to any one of the examples 1-1-1-3. That is, in the example 1-4, a part of all pieces of IRC Type1 necessary information is transmitted using any of the methods of examples 1-1-1-3, and other information (lacking information) is estimated in the user apparatus 100.

More particularly, in the example 1-4, PMI is estimated by using ZP (Zero Power) CSI-RS in the connecting cell.

Figure 19:
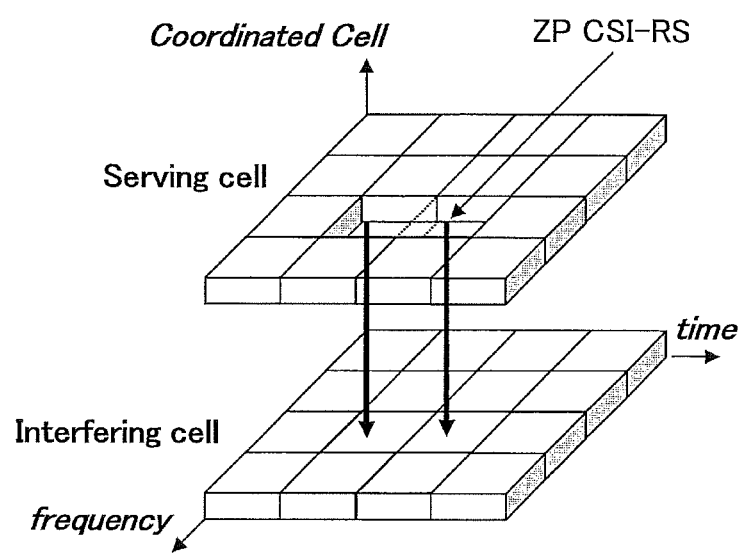
FIG. 19 is a diagram for explaining ZP CSI-RS.

As shown in FIG. 19, ZP CSI-RS is a signal in which a signal of the connecting cell is muted (power is 0) for interference power measurement. The location of the ZP resource that overlaps with PDSCH of the interference signal is reported to the user apparatus 100 by upper layer signaling (RRC signaling, in more detail), so that the user apparatus 100 can perform interference power measurement at the ZP CSI-RS of the resource. Since the ZP CSI-RS is equivalent to the CSI-RS configuration, the periodicity is 5-80 msec. Also, the periodicity is reported to the user apparatus 100 by upper layer signaling (example: system information).

Figure 20:
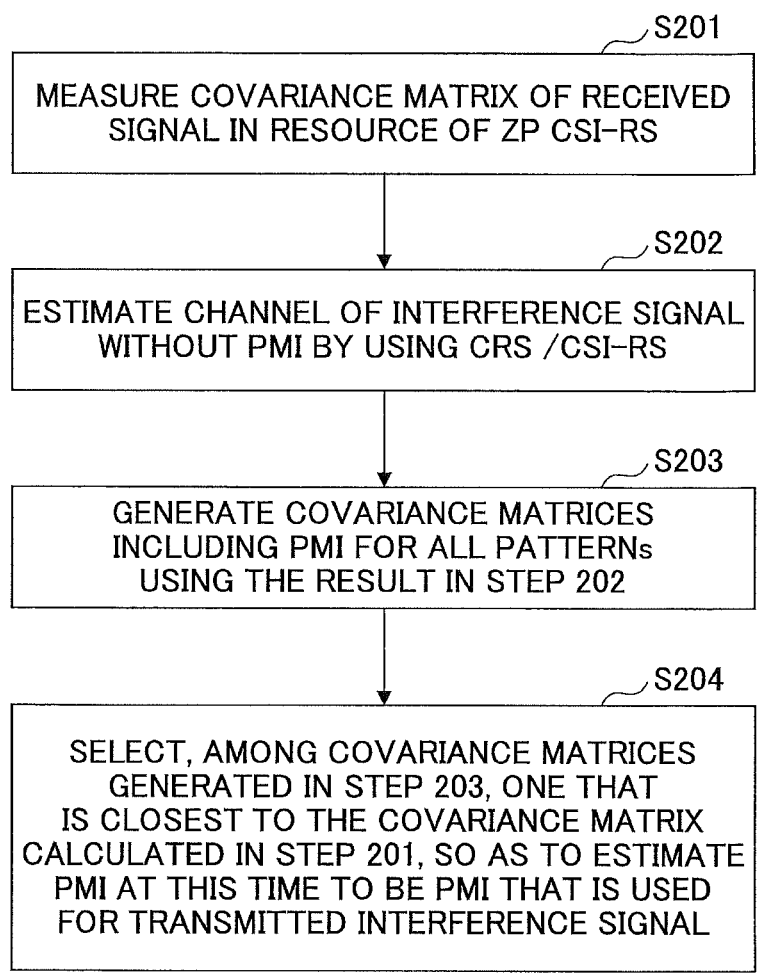
FIG. 20 is a flowchart of processes for PMI estimation executed by the user apparatus.

In the example 1-4, processing for PMI estimation executed by the user apparatus 100 is described with reference to the flowchart of FIG. 20.

In step 201, the user apparatus 100 obtains a covariance matrix of a received signal that is received at the resource of ZP CSI-RS. Accordingly, the user apparatus 100 can obtain the covariance matrix including precoding information of the interference signal.

In step 202, the user apparatus 100 estimates a channel of the interference signal at the resource without precoding information by using CRS or CSI-RS.

In step 203, the user apparatus 100 generates (calculates) covariance matrices of the interference signal for all patters of PMI using the channel information estimated in step 202 and precoding matrices corresponding to all patterns of PMI. That is, when there are 4 types of PMI, four covariance matrices are generated.

In step 204, the user apparatus 100 selects, among all of the covariance matrices generated in step 203, one that is closest to the covariance matrix calculated in step 201, so as to estimate the precoding matrix (PMI) that is used for the closest covariance matrix to be a precoding matrix corresponding to the interference signal that is transmitted.

In the example 1-4, the lacking IRC Type1 necessary information can be sent to the user apparatus without increasing of overhead of the control signal transmitted by the connecting base station 200.

As to examples 1-1-1-4, as long as IRC Type1 necessary information can be eventually obtained by the user apparatus 100, the examples 1-1-1-4 may be combined and used in any way. For example, examples 1-1, 1-2 and 1-4 may be combined so that the user apparatus 100 obtains necessary information for performing IRC Type1 based on, for each interference signal, "DCI notification"+"replacement of information in DCI of desired signal"+"estimation of lacking information". Also, for example, examples 1-2, 1-3 and 1-4 may be combined so that the user apparatus 100 obtains necessary information for performing IRC Type1 based on "replacement of a part or all of information of DCI of connecting cell"+"estimation or addition of lacking information".

<Reduction of Granularity of PMI for Reducing Amount of Information to be Sent>

As the outline is already described, as to PMI in the IRC Type1 necessary information, the connecting base station 200 may decrease the granularity of PMI and send the PMI to the user apparatus 100. This reduction of granularity may be applied to all embodiments.

Figure 21:
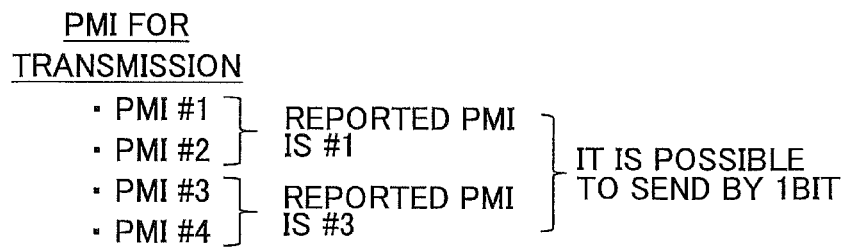
FIG. 21 is a diagram showing an example of reduction of granularity of PMI.

For example, as to a case where two antenna transmission is performed in downlink, 4 types of PMIs are defined in RANK1. Thus, 2 bits are necessary for transmitting the PMI as it is. But, as shown in FIG. 21, as to PMIs corresponding to precoding matrices to be used for actual signal transmission, two types of close PMIs can be aggregated into one so that the whole number of types becomes two. Accordingly, the number of bits of PMI to be transmitted to the user apparatus 100 can be decreased from two to one Although this case is an example when the transmission antenna number is two, the decrease of granularity may be applied to any number of transmission antennas. For example, when the number of transmission antennas is four, the number of types of PMI becomes 16, which requires 4 bits. In this case, the number of types can be decreased to 4 (2 bits) by decreasing granularity. In this case, compared to a case where decrease of granularity is not performed, characteristics may be deteriorated to some extent, but, the amount of information to be sent can be decreased.

<Configuration of Apparatus>

Figure 22:
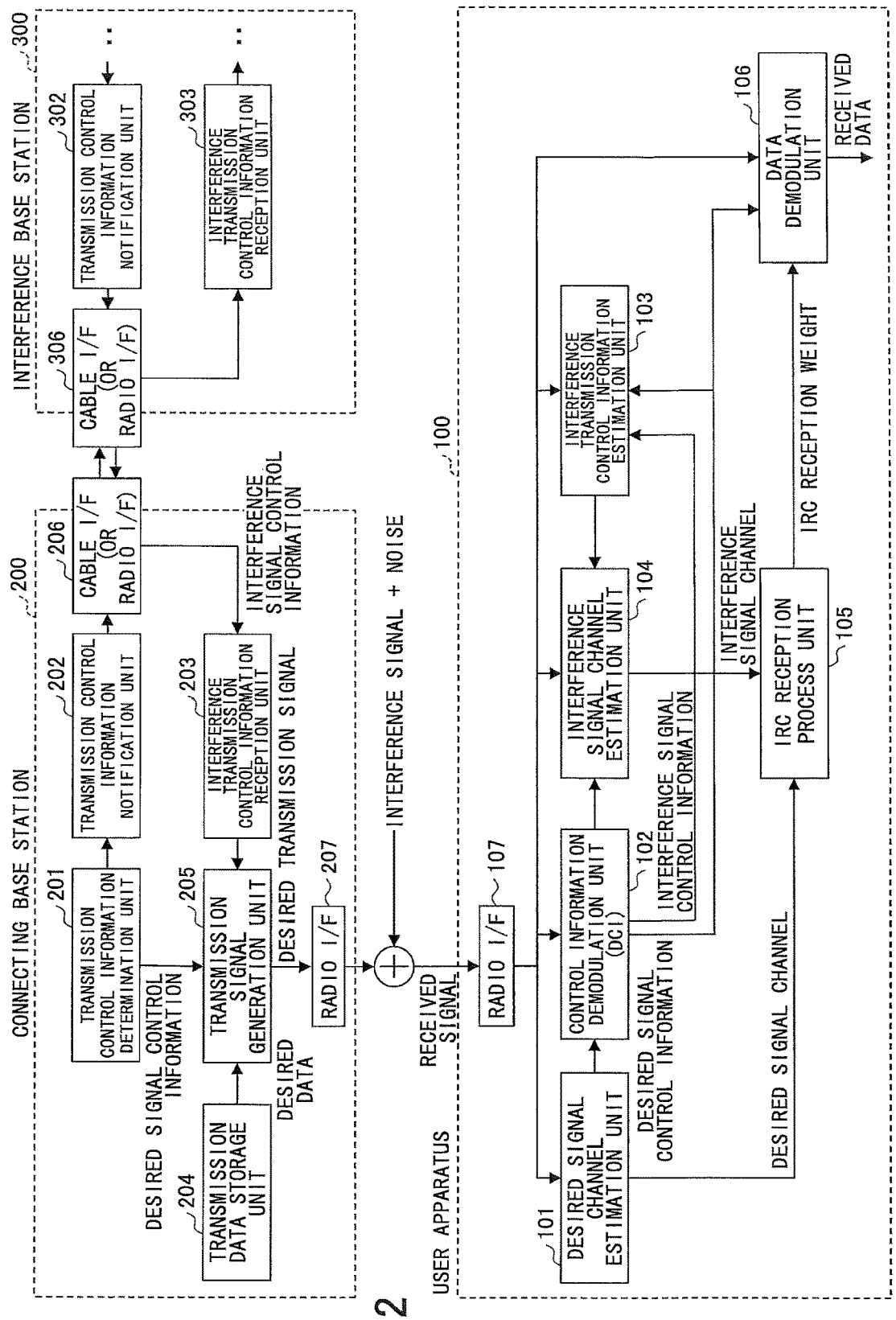
FIG. 22 shows a system block diagram in the first embodiment.

FIG. 22 shows a functional block diagram showing a functional configuration of a communication system of the present embodiment. FIG. 22 shows, as components of the communication system, a connecting base station 200, an interference base station 300, and a user apparatus 100.

As shown in FIG. 22, the connecting base station 200 includes a transmission control information determination unit 201, a transmission control information notification unit 202, an interference transmission control information reception unit 203, a transmission data storage unit 204, a transmission signal generation unit 205, a cable I/F 206 (or radio I/F 206), and a radio I/F 207. Each base station has the same configuration, thus, the interference base station 300 has the same configuration as that of the connecting base station 200. However, for convenience sake, only a transmission control information notification unit 302, an interference transmission control information reception unit 303 and a cable I/F 306 (or radio I/F 306) are shown for the interference base station 300.

The transmission control information determination unit 201 determines transmission control information of a desired signal. The transmission control information notification unit 202 sends, to another base station, transmission control information of a desired signal necessary for IRC Type1 reception processing. The transmission control information of a desired signal necessary for IRC Type1 reception processing is IRC Type 1 necessary information described with reference to FIGS. 6-8 and the like.

The interference transmission control information reception unit 203 receives transmission control information of another base station necessary for IRC Type1 reception processing. The transmission control information received here becomes transmission control information of an interference signal that the connecting base station 200 sends to the user apparatus 100.

The transmission data storage unit 204 is a memory for storing transmission data. The transmission signal generation unit 205 generates, based on the transmission control information of the desired signal, a desired transmission signal including the transmission control information of the desired signal, the transmission control information of the interference signal, and desired transmission data. For example, when it is necessary to perform a process for replacing normal information of DCI with the transmission control information of the interference signal, the process is performed by the transmission signal generation unit 205. The cable I/F 206 (or radio I/F 206) is a functional unit for performing transmission and reception of information by a cable between the connecting base station 200 and another base station. The radio I/F 207 is a functional unit for performing transmission and reception of signals by radio between the connecting base station 200 and the user apparatus 100.

Next, the user apparatus 100 is described. As shown in FIG. 22, the user apparatus 100 includes a desired signal channel estimation unit 101, a control information demodulation unit 102, an interference transmission control information estimation unit 103, an interference signal channel estimation unit 104, an IRC reception process unit 105, a data demodulation unit 106, and a radio I/F 107. The interference transmission control information estimation unit 103, the interference signal channel estimation unit 104, the IRC reception process unit 105, and the data demodulation unit 106 are an example of interference reducing means.

The desired signal channel estimation unit 101 estimates a channel for the desired signal from the received signal. The control information demodulation unit 102 demodulates transmission control information of the desired signal and transmission control information of the interference signal from the received signal based on the channel estimation value for the desired signal estimated by the desired signal channel estimation unit 101.

The interference transmission control information estimation unit 103 estimates lacking information for performing channel estimation for the interference signal. This functional unit is necessary when performing operation of estimating lacking information for channel estimation for the interference signal like the example 1-4, but it is unnecessary when the operation is not performed.

The interference signal channel estimation unit 104 estimates a channel for an interference signal based on transmission control information of the interference signal obtained by the control information demodulation unit 102 (and interference transmission control information estimation unit 103 as necessary). When a part of information in DCI is replaced with transmission control information of the interference signal, the interference signal channel estimation unit 104 interprets and uses the replaced information as the transmission control information of the interference signal. The IRC reception process unit 105 generates an IRC reception weight from the channel of the desired signal and the channel of the interference signal. The data demodulation unit 106 demodulates transmission data from the received signal based on the generated IRC reception weight and the transmission control information.

<Operation of the Apparatus>

Figure 23:
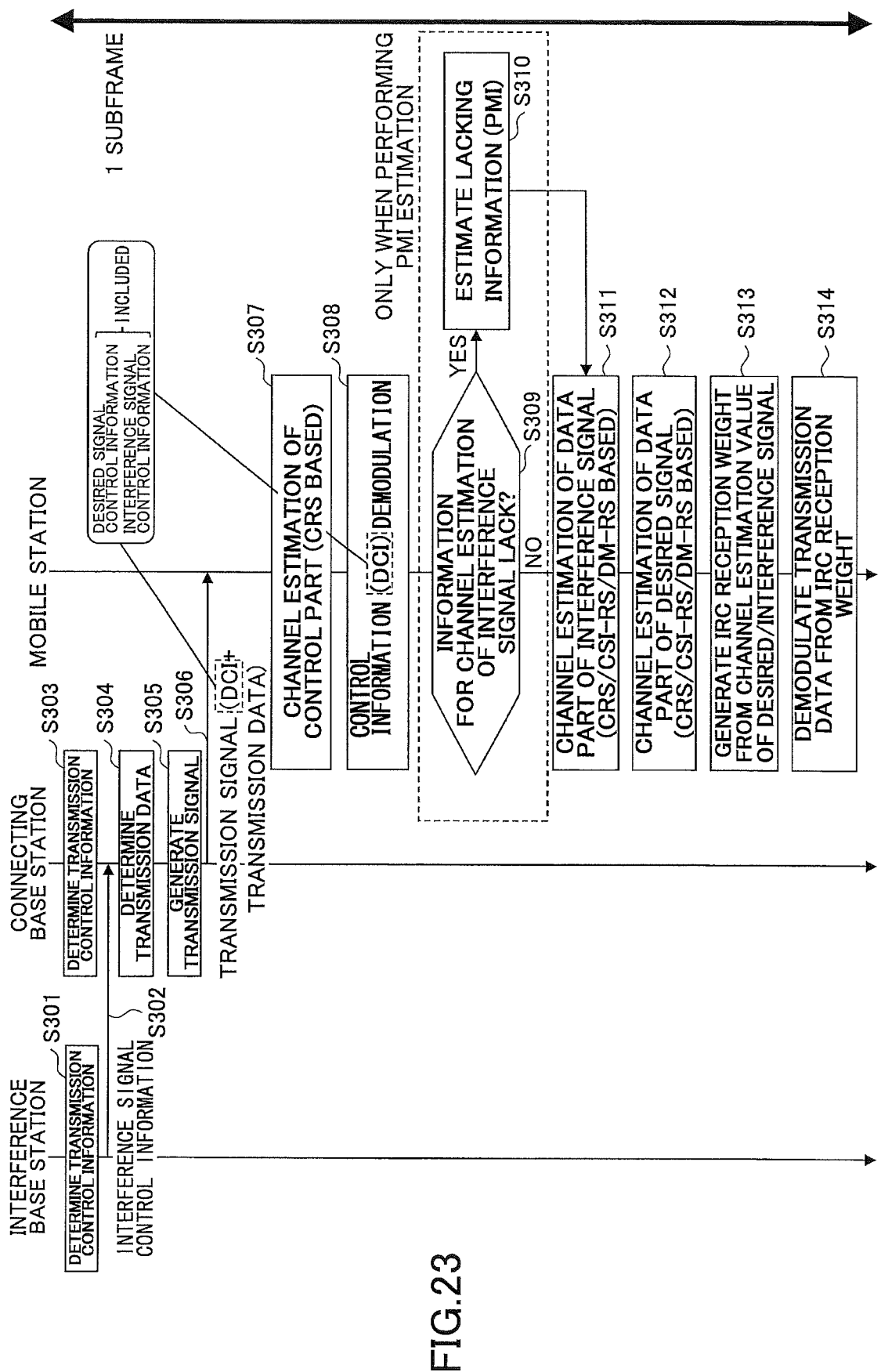
FIG. 23 is a diagram for explaining operation of the system in the first embodiment.

Next, operation of the communication system having the configuration shown in FIG. 22 is described with reference to the sequence diagram shown in FIG. 23.

The transmission control information determination unit of the interference base station 300 determines transmission control information of a desired signal at the interference base station (interference signal for the user apparatus 100) (step 301). The transmission control information notification unit 302 of the interference base station 300 transmits the transmission control information to the connecting base station 200 (step 302).

On the other hand, in the connecting base station 200, the transmission control information determination unit 201 determines transmission control information of the desired signal at the connecting base station 200 (step 303). Also, the interference transmission control information reception unit 203 receives the transmission control information transmitted from the interference base station 300 in step 302 as transmission control information of an interference signal.

The transmission signal generation unit 205 of the connecting base station 200 determines transmission data and obtains it from the transmission data storage unit 204 (step 304) to generate a transmission signal with transmission control information (step 305) and transmit the transmission signal to the user apparatus 100 (step 306).

In the user apparatus that receives the transmission signal, the control information demodulation unit 102 performs channel estimation on a resource of control information part by using CRS from the connecting base station 200 (step 307) so as to demodulate control information (DCI) from the received signal (step 308).

In step 309, the control information demodulation unit 102 determines whether there is a shortage of information for channel estimation of an interference signal. If there is the shortage, as shown in the example 1-4, the interference transmission control information estimation unit estimates the lacking information (step 310). If the information does not lack, the process goes to step 311.

For an example in which lack of information for channel estimation of the interference signal is not assumed, like the Examples 1-1-1-3, steps 309 and 310 are unnecessary.

Next, the interference signal channel estimation unit 104 performs channel estimation of a data part of the interference signal by using the transmission control information of the interference signal (step 311). Also, the desired signal channel estimation unit 101 performs channel estimation of a data part of the desired signal by using the transmission control information of the desired signal (step 312)

Next, the IRC reception processing unit 105 generates an IRC reception weight by using the channel estimation value of the desired signal obtained in step 311 and the channel estimation value of the interference signal obtained in step 312 (step 313). Then, the data demodulation unit 106 demodulates transmitted data from the received signal using the IRC reception weight obtained in step 313 to obtain received data (step 314).

According to the technique of the first embodiment, it becomes possible that the user apparatus can perform IRC Type1 that has high interference reduction ability by using signaling and the like in LTE-Advanced, so that interference reduction ability improves in the user apparatus.

Second Embodiment

In the first embodiment, basically, IRC Type1 necessary information is transmitted to the user apparatus 100 by a channel (PDCCH, more particularly) used for physical layer signaling. But, the present invention is not limited to this, and the IRC Type1 necessary information may be semi-statically sent to the user apparatus 100. In the second embodiment, an embodiment is described in which the IRC Type1 necessary information is semi-statically sent to the user apparatus 100.

The configuration of the whole system in the second embodiment is the same as that in the first embodiment. That is, the system is configured to include the connecting base station 200, the user apparatus 100 and the interference base station 300.

In the second embodiment, basically, the IRC Type1 necessary information is sent from the connecting base station 200 to the user apparatus 100 using RRC signaling information. Since the RRC signaling is performed semi-statically, the second embodiment in which IRC Type1 necessary information is sent using RRC signaling is an embodiment in which IRC Type1 necessary information is sent semi-statically. In the following, basic features in the second embodiment are described more concretely.

A technique on Quasi Co-location is proposed in relation to CoMP (technique for transmitting downlink signals from a plurality of transmission points (TP: Transmission Point))) in LTE-Advanced (Rel.11). It is defined that, when predetermined long term propagation characteristics are the same among different APs (Antenna Ports), these different APs are in Quasi Co-location. Physical locations of these APs are not necessarily close to each other.

In the CoMP of LTE-Advanced (Rel.11), it is possible to switch between TPs instantaneously for transmitting PDSCH (and DM-RS) in order to improve reception quality in the user apparatus 100. In this case, it is assumed that time and frequency offsets of a signal arriving at the user apparatus 100 is different for each TP. Thus, the connecting base station 200 transmits information for the user apparatus 100 to properly correct these time and frequency offsets. More particularly, the connecting base station 200 transmits information indicating which TP transmits the reference signal (CRS, CSI-RS) that is in Quasi Co-location with DM-RS received by the user apparatus 100. The user apparatus 100 corrects the time and frequency offsets of the PDSCH (and DM-RS) by using the reference signal that is in Quasi Co-location with the received DM-RS.

In the present embodiment, it is assumed that the Quasi Co-location information is sent, and it is assumed that predetermined pieces of information for neighboring 4TPs (Transmission Point) at the maximum are transmitted to the UE by upper layer signaling (RRC signaling, more specifically) (non-patent documents 5 and 6).

As the predetermined pieces of information, there are following pieces of information, for example.

Number of CRS antenna ports for PDSCH RE mapping (the number of CRS antenna ports for PDSCH resource element mapping)

CRS frequency shift for PDSCH RE mapping (CRS frequency shift for PDSCH resource element mapping)

MBSFN subframe configuration for PDSCH RE mapping (MBSFN subframe configuration for PDSCH resource element mapping)

Zero-power CSI-RS resource configuration(s) for PDSCH RE mapping (Zero-power CSI-RS resource configuration(s) for PDSCH resource element mapping)

PDSCH starting position for PDSCH RE mapping (PDSCH starting position for PDSCH resource element mapping)

CSI-RS resource configuration identity for PDSCH RE mapping (CSI-RS resource configuration identity for PDSCH resource element mapping)

In the CSI-RS resource configuration identity for PDSCH RE mapping, VOID, Power boosting information and antenna ports are included.

The information sent by the physical layer signaling (PDCCH, more specifically) is a configuration (#1~#4) of a TP from which the PDSCH is received (refer to FIG. 24).

When 2 bits of the parameter is added to the DCI format 2C, it becomes the DCI format 2D.

In a case where Quasi Co-location is performed, information sent to the user apparatus by RRC signaling includes, for each TP, PCID, the number of CRS antenna ports, MBSFN configuration, CRS power boosting information, VCID, the number of CSI-RS antenna ports, CSI-RS power boosting information, and PDSCH start symbol. These pieces of information are a part of necessary information for executing IRC Type1.

Therefore, in the present embodiment, the user apparatus 100 performs channel estimation necessary for IRC Type1 by utilizing the information sent by RRC signaling in Quasi Co-location. Also, in the present embodiment, neighboring TPs of the focused connecting base station are regarded as interference base stations.

Other than the Quasi Co-location, if a technique is defined in LTE-Advanced in which necessary information for executing IRC Type1 is sent by RRC signaling, channel estimation necessary for IRC Type1 may be performed by using the information. Also, irrespective of information reported by the RRC signaling defined in the present LTE-Advanced, for executing IRC Type 1, the connecting base station may obtain IRC Type1 necessary information of the interference base station so as to transmit the information by including this information into RRC signaling.

FIG. 25 is a diagram showing information for each TP that is transmitted by RRC signaling from the connecting base station, and information necessary for IRC Type1 by comparing them. As shown in FIG. 25, the information sent by the RRC signaling is not enough, and there is lacking information. As to the lacking information, the information may be reported by RRC signaling or physical layer signaling, for example. Also, there is information that can be omitted as shown in FIG. 16.

Examples of the present embodiment are explained below, including how to send information which is not sent only by RRC signaling in the Quasi Co-location or other RRC signaling (these RC signaling are called simply "RRC signaling" hereinafter).

Example 2-1

In the Example 2-1, in a case where there is a shortage of information as IRC Type1 necessary information only by RRC signaling, the user apparatus 100 estimates the lacking information. More specifically, in the same way as the method described in the example 1-4, the user apparatus 100 estimates PMI by utilizing ZP (zero power) CSI-RS in the connecting cell. The process content is the same as that explained in the example 1-4.

Example 2-2

In the example 2-2, in a case where there is a shortage of information as IRC Type1 necessary information only by RRC signaling, a part or all of pieces information of downlink control information described in DCI is replaced with the lacking information, so that the DCI where replacement is performed is sent to the user apparatus using PDCCH in the same way as the method exampled in the Example 1-2. Then, the user apparatus 100 extracts, from the information of the DCI, the replaced information as information necessary for executing IRC Type1, and uses it for executing IRC Type 1. That is, the user apparatus 100 reads the information at the replacement target position in the DCI as IRC Type1 necessary information for use.

The replacement is performed, for example, by using free bits in a plurality of bits corresponding to the original downlink control information. Also, in DCI, downlink control information that cases no problem even if it is not sent may be replaced with the IRC Type1 necessary information. The downlink control information that cases no problem even if it is not sent is, for example, downlink control information sent to the user apparatus 100 by a control signal other than the DCI, downlink control information, that is sent by the DCI, whose frequency of transmission may be low, and the like. As to the downlink control information whose frequency of transmission may be low, for example, the downlink control information is replaced with the IRC Type1 necessary information every predetermined number of subframes.

An example of replacement in the example 2-2 is described with reference to FIG. 26. FIG. 26 shows DCI format 2D. In this example, as shown in FIG. 26, since $n_{SCID}$ (1 bit) is sent by RRC signaling, the $n_{SCID}$ (1 bit) in the DCI format 2D is replaced with PMI (1 bit) (example: PMI on interference signal of dominant interference cell) where granularity has been decreased by the before-mentioned method, so that the DCI format 2D is sent from the connecting base station 200 to the user apparatus 100. The user apparatus 100 interprets the bit at the position of $n_{SCID}$ as PMI, and uses it for calculation of IRC Type1.

Of course, the bit used for replacement is not limited to the above-mentioned example. For example, the bit explained in the example 1-2 may be used, and also, other bit may be used.

Example 2-3

In the example 2-3, in a case where there is a shortage of information as IRC Type1 necessary information only by RRC signaling, the lacking information is added to downlink control information described in DCI, and the DCI to which the lacking information is added is sent to the user apparatus by PDCCH.

An example of addition of information in the example 2-3 is described with reference to FIG. 27. FIG. 27 shows DCI format 2D. In the example of FIG. 27, granularity-decreased PMI (1 bit) and RI (3 bits) for adjacent 3 TPs are added. The user apparatus 100 that receives this DCI extracts the added information and uses it for calculation of IRC Type1. Of course, this is merely an example, and other information may be added.

As long as the user apparatus eventually can obtain necessary information for executing IRC Type1, examples 2-1-2-3 may be combined and used in any way. For example, "notification by RRC signaling"+"estimation of lacking information"+"replacement of information in DCI with lacking information"+"addition of lacking information to DCI" may be executed so as to obtain necessary information for IRC Type1.

<Configuration of Apparatus>

Figure 28:
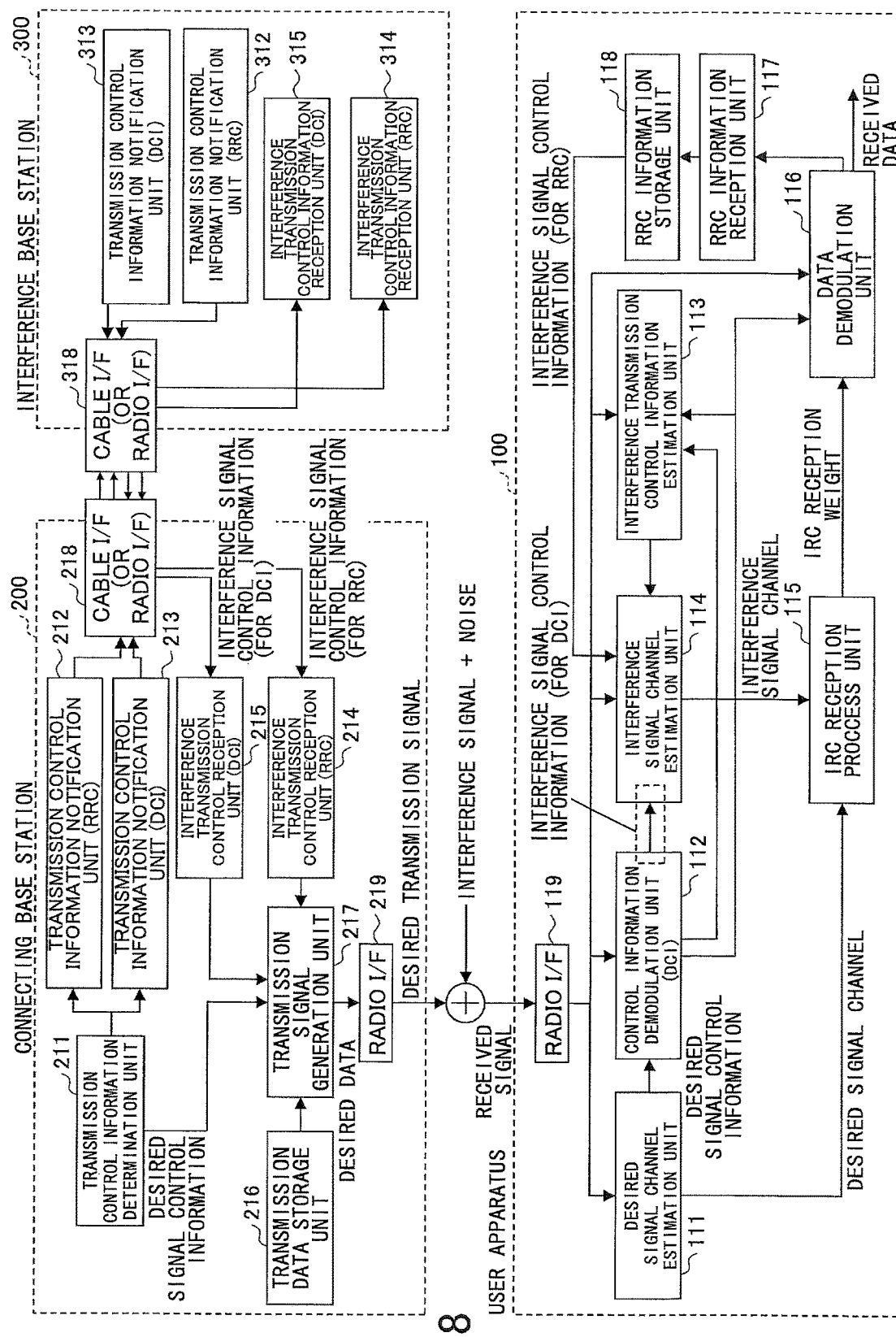
FIG. 28 is a system block diagram in a second embodiment.

FIG. 28 shows a functional block diagram showing a functional configuration of a communication system of the present embodiment. FIG. 28 shows, as components of the communication system, a connecting base station, an interference base station, and a user apparatus.

As shown in FIG. 28, the connecting base station 200 includes a transmission control information determination unit 211, a transmission control information notification unit (RRC) 212, a transmission control information notification unit (DCI) 213, an interference transmission control information reception unit (RRC) 214, an interference transmission control information reception unit (DCI) 215, a transmission data storage unit 216, a transmission signal generation unit 217, a cable I/F 218 (or radio I/F 218), and a radio I/F 219. Each base station has the same configuration, thus, the interference base station 300 has the same configuration as that of the connecting base station 200. However, for convenience sake, only a transmission control information notification unit (DCI) 312, a transmission control information notification unit (RRC) 313, an interference transmission control information reception unit (DCI) 315, an interference transmission control information reception unit (RRC) 314, and a cable I/F 318 (or radio I/F 318) are shown for the interference base station 300.

The transmission control information determination unit 211 determines transmission control information of a desired signal. The transmission control information notification unit (RRC) 212 sends, to another base station, information to be sent by RRC in transmission control information of a desired signal necessary for IRC Type1 reception processing. The transmission control information of a desired signal necessary for IRC Type1 reception processing is IRC Type1 necessary information described with reference to FIGS. 6-8 and the like.

The transmission control information notification unit (DCI) 213 sends, to another base station, information to be sent by DCI in transmission control information of a desired signal necessary for IRC Type1 reception processing. When notification by DCI is not performed, the transmission control information notification unit (DCI) 213 is unnecessary.

The interference transmission control information reception unit (RRC) 214 receives transmission control information to be sent by RRC from the interference base station 300. The interference transmission control information reception unit (DCI) 215 receives transmission control information to be sent by DCI from the interference base station 300. When notification by DCI is not performed, the interference transmission control information reception unit (DCI) 215 is unnecessary.

The transmission data storage unit 216 is a memory for storing transmission data. The transmission signal generation unit 217 generates, based on the desired transmission control, a desired transmission signal including the transmission control information of the desired signal, the transmission control information of the interference signal, and desired transmission data. For example, when it is necessary to perform a process for replacing normal information of DCI with the transmission control information of the interference signal, the process is performed by the transmission signal generation unit 217. The cable I/F 218 (or radio I/F 218) is a functional unit for performing transmission and reception of information by a cable (or by radio) between the connecting base station 200 and another base station. The radio I/F 219 is a functional unit for performing transmission and reception of signals by radio between the connecting base station 200 and the user apparatus 100.

Next, the user apparatus 100 is described. As shown in FIG. 28, the user apparatus 100 includes a desired signal channel estimation unit 111, a control information demodulation unit (DCI) 112, an interference transmission control information estimation unit 113, an interference signal channel estimation unit 114, an IRC reception process unit 115, a data demodulation unit 116, an RRC information reception unit 117, an RRC information storage unit 118, and a radio I/F 119. The interference transmission control information estimation unit 113, the interference signal channel estimation unit 114, the IRC reception process unit 115, and the data demodulation unit 116 are an example of interference reducing means.

The desired signal channel estimation unit 111 estimates a channel for the desired signal from the received signal. The control information demodulation unit (DCI) 112 demodulates transmission control information of the desired signal from the reception signal based on the channel estimation value for the desired signal estimated by the desired signal channel estimation unit 111. In examples in which control information is sent by DCI, the demodulated control information includes transmission control information (DCI) of the interference signal.

The interference transmission control information estimation unit 113 estimates lacking information for performing channel estimation for the interference signal. The interference transmission control information estimation unit 113 is unnecessary when estimation of lacking information is not performed in the user apparatus 100.

The interference signal channel estimation unit 114 estimates a channel for an interference signal based on transmission control information of the interference signal sent by DCI or RRC, or, by DCI and RRC. When a part of information in DCI is replaced with transmission control information of the interference signal, the interference signal channel estimation unit 114 interprets and uses the replaced information as the transmission control information of the interference signal. The IRC reception process unit 115 generates an IRC reception weight from the channel of the desired signal and the channel of the interference signal. The data demodulation unit 116 demodulates transmission data based on the generated IRC reception weight and the transmission control information.

The RRC information reception unit 117 receives transmission control information of the interference signal sent by RRC. The RRC information storage unit 118 stores the transmission control information of the interference signal sent by RRC. The transmission control information stored in the RRC information storage unit 118 is read by the interference signal channel estimation unit 114 and is used for interference signal channel estimation.

<Operation of the Apparatus>

Figure 29:
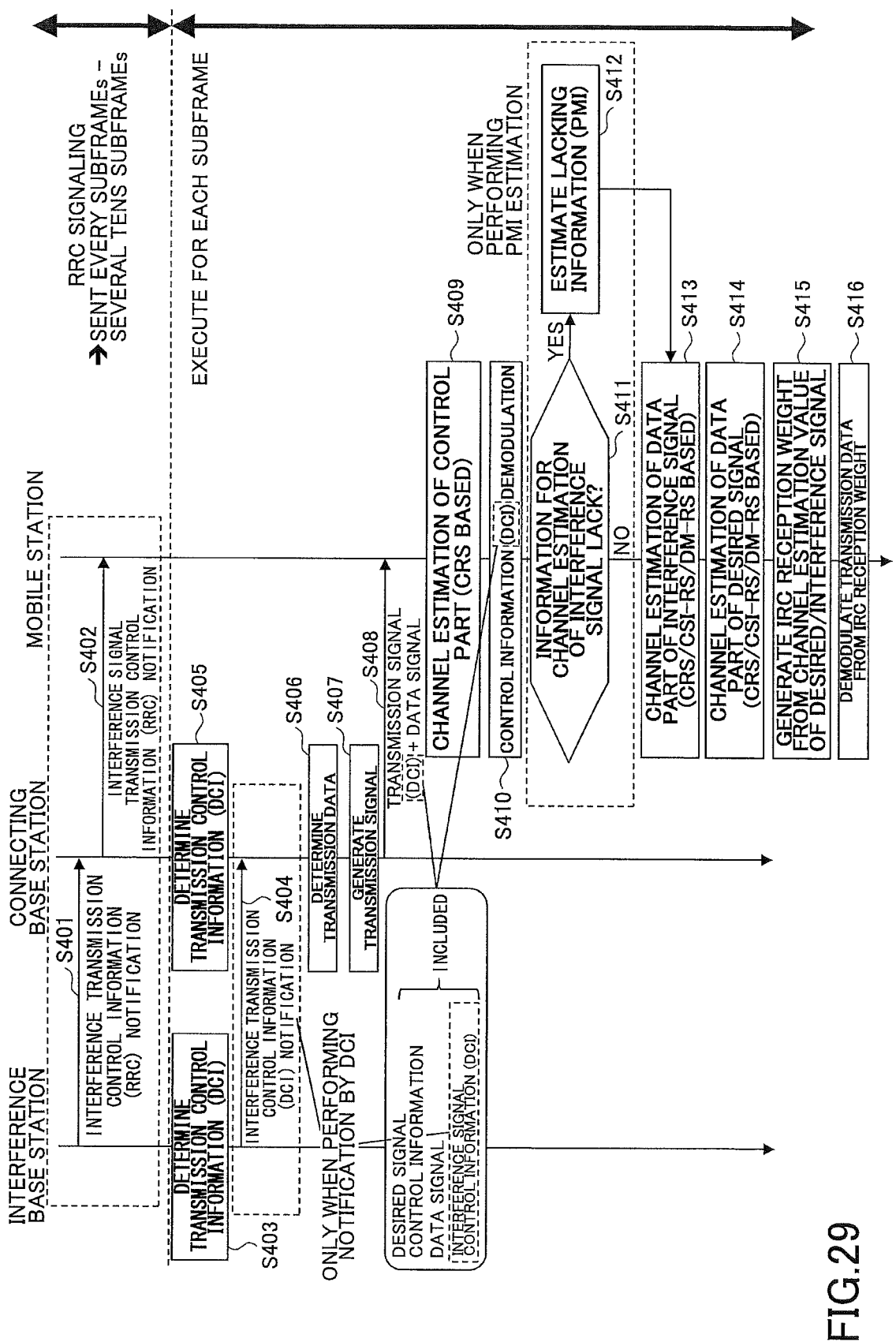
FIG. 29 is a sequence diagram for explaining operation of the system in the second embodiment.

Next, operation of the communication system having the configuration shown in FIG. 28 is described with reference to the sequence diagram shown in FIG. 29.

In an RRC signaling phase, the transmission control information notification unit (RRC) 313 of the interference base station 300 sends transmission control information of a desired signal (interference signal for the user apparatus 100) to be sent by RRC to the connecting base station 200, and the interference transmission control information reception unit (RRC) 214 of the connecting base station 200 receives the transmission control information (step 401). The connecting base station 200 sends the received transmission control information of the interference signal to the user apparatus 100 by RRC signaling (step 402). Following processes are performed for each subframe.

The transmission control information determination unit of the interference base station 300 determines transmission control information of a desired signal at the interference base station 300 (interference signal for the user apparatus 100) (step 403). The transmission control information notification unit (DCI) 313 of the interference base station 300 transmits the transmission control information to the connecting base station 200 (step 404). In a case where transmission control information of the interference signal is not transmitted to the user apparatus 100 by DCI, step 404 is unnecessary.

On the other hand, in the connecting base station 200, the transmission control information determination unit 211 determines transmission control information of the desired signal at the connecting base station 200 (step 405). Also, when step 404 is performed, the interference transmission control information reception unit (DCI) 215 receives the transmission control information transmitted from the interference base station 300 as transmission control information of an interference signal to be transmitted by DCI.

The transmission signal generation unit 217 of the connecting base station 200 determines transmission data and obtains it from the transmission data storage unit 216 (step 406) to generate a transmission signal with transmission control information (step 407) and to transmit the transmission signal to the user apparatus 100 (step 408). In a case where transmission control information of the interference signal is sent to the user apparatus 100 by DCI, this transmission signal includes DCI that includes the transmission control information of the interference signal.

In the user apparatus 100 that receives the transmission signal, the control information demodulation unit 112 performs channel estimation on a resource of the control information part by using CRS from the connecting base station 200 (step 409) so as to demodulate control information (DCI) from the received signal (step 410).

In step 411, the control information demodulation unit 102, for example, determines whether there is a shortage of information for channel estimation of an interference signal. If there is the shortage, as shown in the example 2-1, the interference transmission control information estimation unit 113 estimates the lacking information (step 412). If there is no shortage, the process goes to step 413.

For an example in which control information transmission is performed from the base station 200 to the user apparatus 100 such that the shortage of information does not occur for channel estimation of the interference signal, steps 411 and 412 are unnecessary.

Next, the interference signal channel estimation unit 114 performs channel estimation of a data part of the interference signal by using the transmission control information of the interference signal (step 413). Also, the desired signal channel estimation unit 111 performs channel estimation of a data part of the desired signal by using the transmission control information of the desired signal (step 414)

Next, the IRC reception processing unit 115 generates an IRC reception weight by using the channel estimation value of the desired signal obtained in step 413 and the channel estimation value of the interference signal obtained in step 414 (step 415). Then, the data demodulation unit 116 demodulates transmitted data from the received signal using the IRC reception weight obtained in step 415 to obtain received data (step 416).

According to the technique of the second embodiment, it becomes possible that the user apparatus can perform IRC Type 1 that has high interference reduction ability by using signaling and the like in LTE-Advanced, so that interference reduction ability improves in the user apparatus.

Third Embodiment

Figure 12:
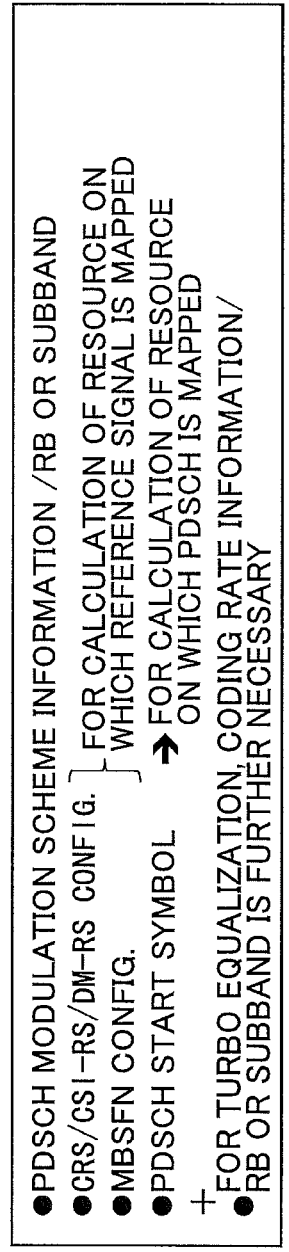
FIG. 12 is a diagram showing information necessary for demodulation of an interference signal in information necessary for SIC.

A case where the user apparatus 100 performs SIC (successive interference cancelation) is described as the third embodiment. As described before, in SIC, it is necessary to generate replica signals for all interference signals. For this purpose, first, information for channel estimation for each interference signal is necessary. This information is the same as the before-mentioned information necessary for IRC Type 1. In addition to that, as shown in FIG. 12, as information for demodulation of the interference signal, PDSCH modulation scheme information for each RB or for each subband, configuration of each of CRS/CSI-RS/DM-RS, MBSFN configuration, and PDSCH start symbol become necessary. Also, for the case of turbo equalization, coding rate information/RB or subband also becomes necessary.

In the present embodiment, the information for performing channel estimation for each interference signal is the same as the information that is sent to the user apparatus in the first embodiment and the second embodiment, so that the information is sent by a method the same as the method of the first embodiment or the second embodiment. Also, additionally, information shown in FIG. 12 is sent.

For additional notification, for example, similarly to the example 1-1 of the first embodiment, a method may be used in which all of the additional pieces of information may be dynamically transmitted by physical layer signaling.

Also, like the basic embodiment in the second embodiment, the information may be transmitted by using the RRC signaling information of Quasi Co-location, or by using the other RRC signaling information.

In this case, as to lacking information, as described in the examples 2-2 and 203 of the second embodiment, the information may be sent by using DCI, and also may be sent using RRC signaling.

More specifically, in the case for utilizing the RRC signaling such as one in the Quasi Co-location and the like, CRS/CSI-RS configuration, MBSFN configuration and PDSCH start symbol, in the information shown in FIG. 12, are transmitted by the RRC signaling. In this case, DM-RS configuration and PDSCH modulation scheme information become lacking information. When turbo equalization is performed, coding rate information also becomes the lacking information. These pieces of lacking information are sent by physical layer signaling or by RRC signaling.

As to functional configuration and operation in the third embodiment, a functional unit of IRC reception processing in the user apparatus 100 is replaced with a functional unit (example: configuration of FIG. 10) for SIC reception processing, and there is additional information in notification information. Other than these, the functional configuration and the operation in the third embodiment are the same as those of the first embodiment or the second embodiment. That is, when notification by RRC signaling is not performed, the functional configuration and the operation are the same as those of the first embodiment. When notification by RRC signaling is performed, the functional configuration and the operation are the same as those of the second embodiment.

According to the technique of the third embodiment, it becomes possible that the user apparatus can perform SIC that has high interference reduction ability by using signaling and the like in LTE-Advanced, so that interference reduction ability improves in the user apparatus.

Fourth Embodiment

The fourth embodiment is an embodiment in a case where the user apparatus performs reception processing of IRC Type 2.

As is already described with reference to FIG. 9, in IRC Type 2, it is necessary to estimate a covariance matrix including only interference noise components from the received reference signal of the connecting cell.

Therefore, in the present embodiment, the user apparatus semi-statically estimates the covariance matrix including precoding information of the interference signal by using the ZP CSI-RS (Muting of signals of the connecting cell) that is already described in the example 1-4.

That is, the user apparatus 100 of the present embodiment obtains the covariance matrix from the received signal at the resource of the ZP CSI-RS, calculates the reception weight using the equation of Type2 shown in FIG. 2 so as to demodulate data.

In the ZP CSI-RS, since the power of the signal of the connecting cell is reduced, the covariance matrix including only interference noise components can be obtained from the received signal. Therefore, according to the technique of the fourth embodiment, a covariance matrix of high accuracy can be obtained so that interference reduction ability in the user apparatus can be improved.

<Configuration of Apparatus>

Figure 30:
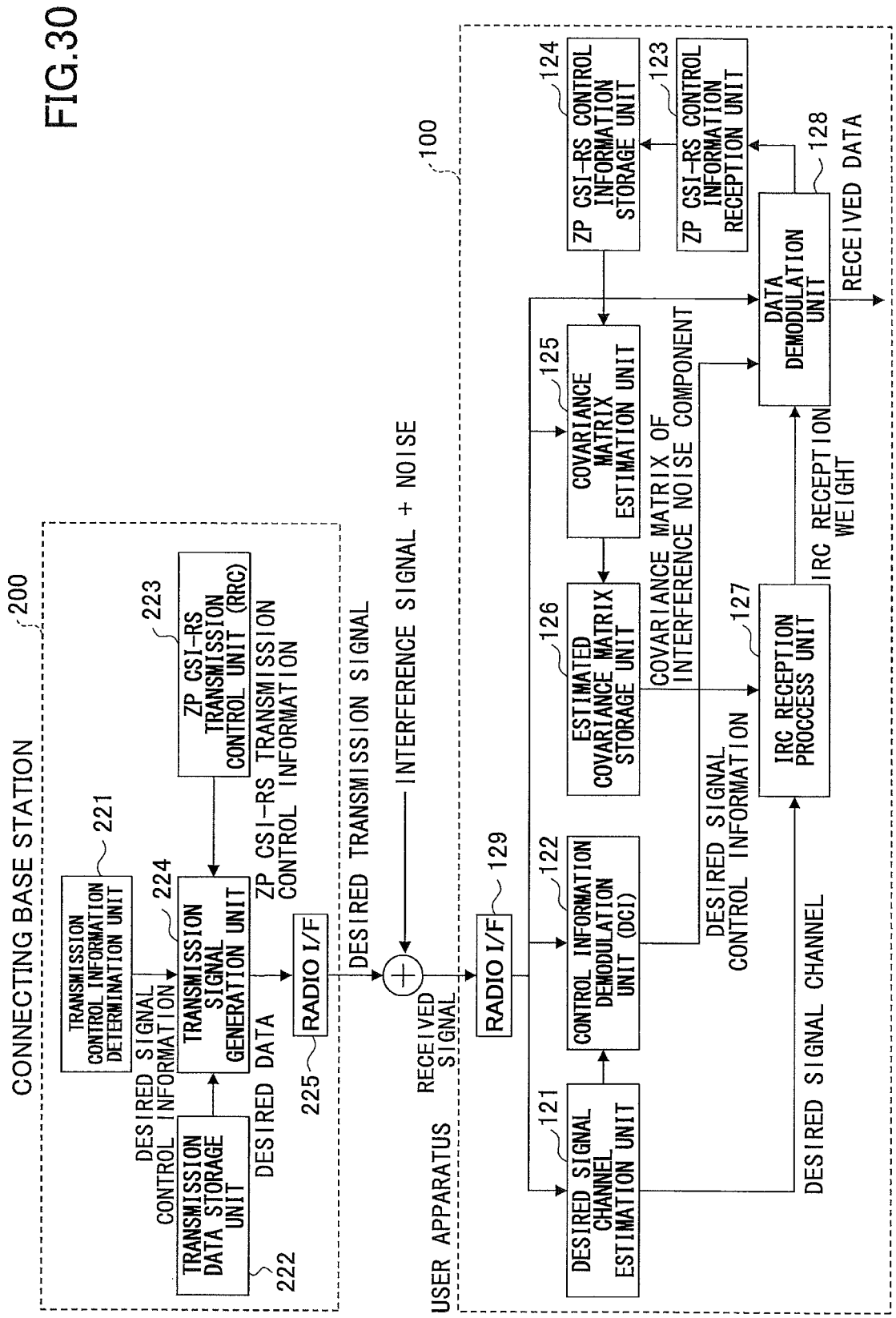
FIG. 30 is a system block diagram in a fourth embodiment.

FIG. 30 shows a functional block diagram showing a functional configuration of a communication system of the present embodiment. FIG. 30 shows, as components of the communication system, a connecting base station 200 and a user apparatus 100.

As shown in FIG. 30, the connecting base station 200 includes a transmission control information determination unit 221, a transmission data storage unit 222, a ZP CSI-RS transmission control unit 223, a transmission signal generation unit 224, and a radio I/F 225.

The transmission control information determination unit 221 determines transmission control information of a desired signal. The transmission data storage unit 222 is a memory for storing transmission data. The ZP CSI-RS transmission control unit 223 performs transmission control of ZP CSI-RS (RRC signaling). The transmission signal generation unit generates, based on the transmission control information of the desired signal, a desired transmission signal including the transmission control information of the desired signal, the ZP CSI-RS control information, and desired transmission data. The radio I/F 225 is a functional unit for performing transmission and reception of signals by radio between the connecting base station 200 and the user apparatus 100.

Next, the user apparatus 100 is described. As shown in FIG. 30, the user apparatus 100 includes a desired signal channel estimation unit 121, a control information demodulation unit 122, a ZP CSI-RS control information reception unit 123, a ZP CSI-RS control information storage unit 124, a covariance matrix estimation unit 125, an estimated covariance matrix storage unit 126, an IRC reception process unit 127, a data demodulation unit 128, and a radio I/F 129.

The desired signal channel estimation unit 121 estimates a channel for the desired signal from the received signal. The control information demodulation unit 122 demodulates transmission control information of the desired signal from the reception signal based on the channel estimation value for the desired signal estimated by the desired signal channel estimation unit 121. The ZP CSI-RS control information reception unit 123 receives ZP CSI-RS control information transmitted by RRC. The ZP CSI-RS control information is, for example, information indicating the ZP resource. The ZP CSI-RS control information storage unit 124 is a memory for storing the ZP CSI-RS control information transmitted by RRC.

The covariance matrix estimation unit 125 estimates the covariance matrix of the interference noise component of the received signal based on the ZP CSI-RS control information of the desired signal received from the ZP CSI-RS control information storage unit 124. The estimated covariance matrix storage unit 126 is a memory for storing the covariance matrix of the interference noise component estimated by the covariance matrix estimation unit 125.

The IRC reception process unit 127 generates an IRC reception weight from the channel of the desired signal and the covariance matrix of the interference noise component. The data demodulation unit 128 demodulates transmission data based on the generated IRC reception weight and the transmission control information.

<Operation of the Apparatus>

Figure 31:
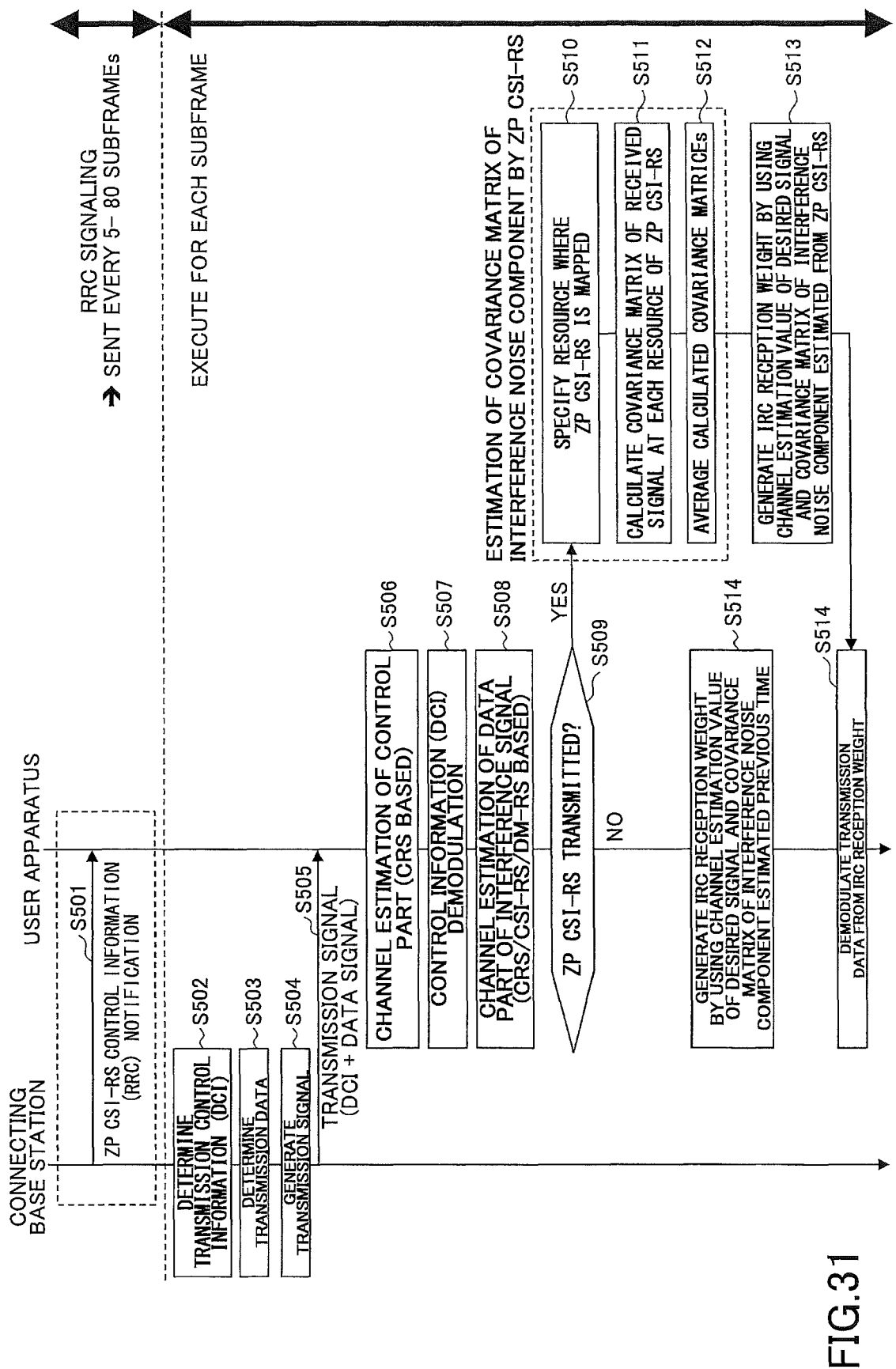
FIG. 31 is a sequence diagram for explaining operation of the system in the fourth embodiment.

Next, operation of the communication system having the configuration shown in FIG. 30 is described with reference to the sequence diagram shown in FIG. 31.

In the RRC signaling phase, the connecting base station 200 sends, to the user apparatus 100 by RRC signaling, the ZP CSI-RS transmission control information that is generated by the ZP CSI-RS transmission control unit 223 (step 501). In the user apparatus 100 that receives the ZP CSI-RS transmission control information, the ZP CSI-RS transmission control information is stored in the ZP CSI-RS transmission control information storage unit 124. Following processes are performed for each subframe.

The transmission control information determination unit 221 of the connecting base station 200 determines transmission control information of the desired signal in the connecting base station (step 502). The transmission signal generation unit 224 of the connecting base station 200 determines transmission data and obtains it from the transmission data storage unit 222 (step 503) to generate a transmission signal with transmission control information of the desired signal (step 504) and transmit the transmission signal to the user apparatus 100 (step 505).

In the user apparatus 100 that receives the transmission signal, the control information demodulation unit 122 performs channel estimation on a resource of the control information part by using CRS from the connecting base station 200 (step 506) so as to demodulate control information (DCI) from the received signal (step 507). Also, the desired signal channel estimation unit 121 performs channel estimation of a data part of the desired signal by using the transmission control information of the desired signal (step 508).

In a case where ZP CSI-RS is transmitted at the subframe (Yes in step 509), the covariance matrix estimation unit 125 specifies the resource where ZP CSI-RS is mapped based on the ZP CSI-RS control information (step 510), calculates covariance matrix of the received signal at each resource of the ZP CSI-RS (step 511), and averages the calculated covariance matrices (step 512). The covariance matrix obtained in step 512 is stored in the estimated covariance matrix storage unit 126.

Then, the IRC reception processing unit 127 reads the covariance matrix of the interference noise component estimated from ZP CSI-RS from the estimated covariance matrix storage unit 126 so as to generate an IRC reception weight by using the covariance matrix and the channel estimation value of the desired signal (step 513). Then, the data demodulation unit 128 demodulates transmitted data from the received signal using the IRC reception weight to obtain received data (step 515).

In a case where ZP CSI-RS is not transmitted (No in step 509), the IRC reception processing unit 127 generates an IRC reception weight by using the channel estimation value of the desired signal and the covariance matrix of the interference noise component that is estimated previous time (step 514), then, the process goes to step 515.

(Other Apparatus Configuration Example)

Figure 32:
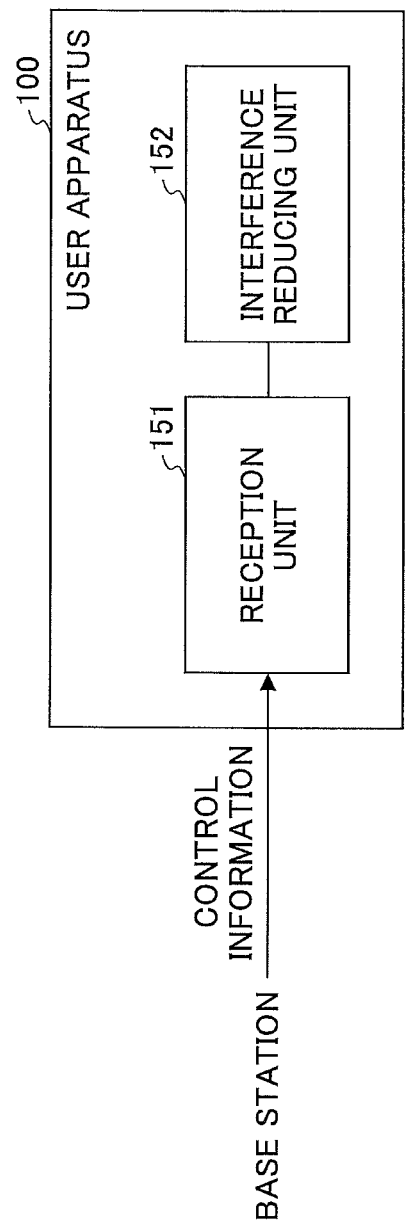
FIG. 32 is a diagram showing a configuration example of a user apparatus.

The apparatus configurations described so far are merely examples. For example, the user apparatus 100 may be configured as shown in FIG. 32. The user apparatus 100 shown in FIG. 32 is a user apparatus in a radio communication system including a plurality of base stations, including: a reception unit 151 configured to receive, from a connecting base station, control information to be used for reducing an interference signal sent from an interference base station for the user apparatus; and an interference reducing unit 152 configured to reduce the interference signal by using the control information to obtain a desired signal sent from the connecting base station.

The reception unit 151 receives the control information as downlink control information that is transmitted by a downlink physical layer signaling channel from the connecting base station, or, receives the control information by RRC signaling from the connecting base station. The downlink control information includes predetermined information based on a predetermined format, and a part of information in the predetermined information is replaced with a part of the control information in the downlink control information received from the connecting base station, and wherein in a case where the control information is received as the downlink control information, the interference reducing unit 152 uses the replaced information as the part of the control information.

The user apparatus 100 shown in FIG. 32 may further includes an estimation unit configured to estimate, in the control information to be used for reducing the interference signal, precoding information that is a part of control information used for channel estimation of the interference signal by using a received signal at a resource for receiving a zero power reference signal. The interference reducing unit 152 is an IRC processing unit configured to perform interference rejection combining reception based on channel estimation of an interference signal, or, a SIC processing unit configured to perform successive interference cancellation.

Figure 33:
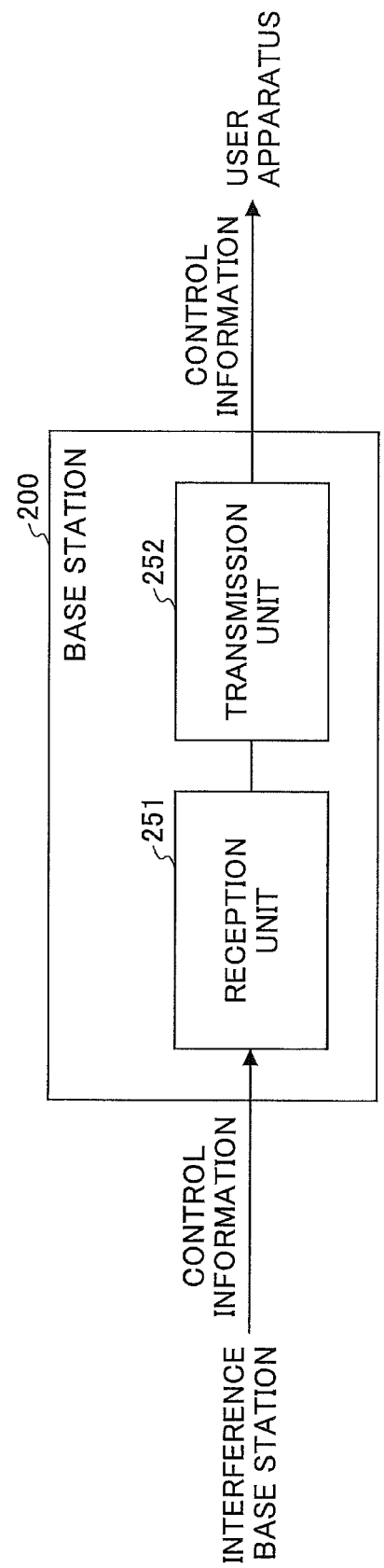
FIG. 33 is a diagram showing a configuration example of a base station.

The base station 200 may be configured as shown in FIG. 33. The base station 200 shown in FIG. 33 is a base station connecting with a user apparatus in a radio communication system, including: a reception unit 251 configured to receive, from an interference base station, control information to be used by the user apparatus for reducing an interference signal sent from the interference base station for the user apparatus; and a transmission unit 252 configured to transmit the control information to the user apparatus as downlink control information by a downlink physical layer signaling channel, or, transmit the control information to the user apparatus by RRC signaling.

The downlink control information includes, for example, predetermined information based on a predetermined format, and, in a case where the transmission unit 252 transmits the control information to the user apparatus as the downlink control information, the transmission unit 252 replaces a part of information in the predetermined information in the downlink control information with a part of the control information so as to transmit the downlink control information where replacement is performed to the user apparatus. The control information is information to be used by the user apparatus for performing interference rejection combining reception based on channel estimation of an interference signal, or, the control information is information to be used by the user apparatus for performing successive interference cancellation.

In the above, the present invention has been explained while referring to the specific embodiments. However, these are merely exemplary. Those skilled in the art will conceive of various modified examples, corrected examples, alternative examples, substituted examples, and the like. While specific numerical value examples are used to facilitate understanding of the present invention, such numerical values are merely examples, and any appropriate value may be used unless specified otherwise. Classification into each item in the description is not essential in the present invention, and features described in two or more items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the user apparatus UE and the radio base station eNB have been explained by using functional block diagrams. However, the apparatuses may be implemented in hardware, software, or a combination thereof. The software that operates according to the present invention may be stored in any proper storage medium such as a RAM (Random Access Memory), a flash memory, a ROM (Read Only Memory), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present international application claims priority based on Japanese patent application No. 2012-288896, filed in the JPO on Dec. 28, 2012, and the entire contents of the Japanese patent application No. 2012-288896 are incorporated herein by reference.

DESCRIPTION OF REFERENCE SIGNS

100 user apparatus
101 desired signal channel estimation unit
102 control information demodulation unit
103 interference transmission control information estimation unit
104 interference signal channel estimation unit
105 IRC reception process unit 106 data demodulation unit
107 radio I/F
111 desired signal channel estimation unit
112 control information demodulation unit (DCI)
113 interference transmission control information estimation unit
114 interference signal channel estimation unit
115 IRC reception process unit
116 data demodulation unit
117 RRC information reception unit
118 RRC information storage unit
119 radio I/F
121 desired signal channel estimation unit
122 control information demodulation unit
123 ZP CSI-RS control information reception unit
124 ZP CSI-RS control information storage unit
125 covariance matrix estimation unit
126 estimated covariance matrix storage unit
127 IRC reception process unit
128 data demodulation unit
129 radio I/F
200 connecting base station
201 transmission control information determination unit
202 transmission control information notification unit
203 interference transmission control information reception unit
204 transmission data storage unit
205 transmission signal generation unit
206 cable I/F (or radio I/F)
207 radio I/F
211 transmission control information determination unit
212 transmission control information notification unit (RRC)
213 transmission control information notification unit (DCI)
214 interference transmission control information reception unit (RRC)
215 interference transmission control information reception unit (DCI)
216 transmission data storage unit
217 transmission signal generation unit
218 cable I/F (or radio I/F)
219 radio I/F 219
221 transmission control information determination unit
222 transmission data storage unit
223 ZP CSI-RS transmission control unit
224 transmission signal generation unit
225 radio I/F
300 interference base station
302 transmission control information notification unit
303 interference transmission control information reception unit
306 cable I/F (or radio I/F)
312 transmission control information notification unit (DCI)
313 transmission control information notification unit (RRC)
314 interference transmission control information reception unit (RRC)
315 interference transmission control information reception unit (DCI)
318 cable I/F (or radio I/F)

The invention claimed is:

1. A user apparatus in a radio communication system including a plurality of base stations, comprising:
a reception unit configured to receive, from a connecting base station, control information to be used for reducing an interference signal sent by a data channel from an interference base station for the user apparatus; and
an interference reducing unit configured to reduce the interference signal sent by the data channel by using the control information to obtain a desired signal sent from the connecting base station,
wherein the control information includes a transmission mode, Multimedia Broadcast multicast service Single Frequency Network (MBSFN) configuration information, a number of antenna ports of a downlink reference signal, and power boosting information, and
wherein the interference reducing unit is configured to reduce the interference signal by assuming that the transmission mode, the MBSFN configuration information, the number of antenna ports, and the power boosting information are used by a neighboring cell.

2. The user apparatus as claimed in claim 1, wherein the reception unit receives the control information as downlink control information that is transmitted by a downlink physical layer signaling channel from the connecting base station, or, receives the control information by RRC signaling from the connecting base station.

3. The user apparatus as claimed in claim 2, wherein the downlink control information includes predetermined information based on a predetermined format, and a part of information in the predetermined information is replaced with a part of the control information in the downlink control information received from the connecting base station, and
wherein in a case where the control information is received as the downlink control information, the interference reducing unit uses the replaced information as the part of the control information.

4. The user apparatus as claimed in claim 3, comprising:
an estimation unit configured to estimate, in the control information to be used for reducing the interference signal, precoding information that is a part of control information used for channel estimation of the interference signal by using a received signal at a resource for receiving a zero power reference signal.

5. The user apparatus as claimed in claim 3,
wherein the interference reducing unit is a unit that performs interference rejection combining reception based on channel estimation of an interference signal, or, a unit that performs successive interference cancellation.

6. The user apparatus as claimed in claim 2, comprising:
an estimation unit configured to estimate, in the control information to be used for reducing the interference signal, precoding information that is a part of control information used for channel estimation of the interference signal by using a received signal at a resource for receiving a zero power reference signal.

7. The user apparatus as claimed in claim 2,
wherein the interference reducing unit is a unit that performs interference rejection combining reception based on channel estimation of an interference signal, or, a unit that performs successive interference cancellation.

8. The user apparatus as claimed in claim 1, comprising:
an estimation unit configured to estimate, in the control information to be used for reducing the interference signal, precoding information that is a part of control information used for channel estimation of the interference signal by using a received signal at a resource for receiving a zero power reference signal.

9. The user apparatus as claimed in claim 8,
wherein the interference reducing unit is a unit that performs interference rejection combining reception based on channel estimation of an interference signal, or, a unit that performs successive interference cancellation.

10. The user apparatus as claimed in claim 1,
wherein the interference reducing unit is a unit that performs interference rejection combining reception based on channel estimation of an interference signal, or, a unit that performs successive interference cancellation.

11. A base station connecting with a user apparatus in a radio communication system, comprising:
a reception unit configured to receive, from an interference base station, control information to be used by the user apparatus for reducing an interference signal sent by a data channel from the interference base station for the user apparatus; and
a transmission unit configured to transmit the control information to the user apparatus as downlink control information by a downlink physical layer signaling channel, or, configured to transmit the control information to the user apparatus by RRC signaling,
wherein the control information includes a transmission mode, Multimedia Broadcast multicast service Single Frequency Network (MBSFN) configuration information, a number of antenna ports of a downlink reference signal, and power boosting information, and
wherein the user apparatus is configured to reduce the interference signal by assuming that the transmission mode, the MBSFN configuration information, the number of antenna ports, and the power boosting information are used by a neighboring cell.

12. The base station as claimed in claim 11, wherein the downlink control information includes predetermined information based on a predetermined format, and
wherein in a case where the transmission unit transmits the control information to the user apparatus as the downlink control information, the transmission unit replaces a part of information in the predetermined information in the downlink control information with a part of the control information so as to transmit the downlink control information where replacement is performed to the user apparatus.

13. The base station as claimed in claim 12, wherein the control information is information to be used by the user apparatus for performing interference rejection combining reception based on channel estimation of an interference signal, or, the control information is information to be used by the user apparatus for performing successive interference cancellation.

14. The base station as claimed in claim 11, wherein the control information is information to be used by the user apparatus for performing interference rejection combining reception based on channel estimation of an interference signal, or, the control information is information to be used by the user apparatus for performing successive interference cancellation.

15. An interference reducing method executed in a user apparatus in a radio communication system including a plurality of base stations, comprising:
a reception step of receiving, from a connecting base station, control information to be used for reducing an interference signal sent by a data channel from an interference base station for the user apparatus; and
an interference reducing step of reducing the interference signal sent by the data channel by using the control information to obtain a desired signal sent from the connecting base station,
wherein the control information includes a transmission mode, Multimedia Broadcast multicast service Single Frequency Network (MBSFN) configuration information, a number of antenna ports of a downlink reference signal, and power boosting information, and
wherein the user apparatus is configured to reduce the interference signal by assuming that the transmission mode, the MBSFN configuration information, the number of antenna ports, and the power boosting information are used by a neighboring cell.

16. An interference reducing control information notification method executed by a base station connecting with a user apparatus in a radio communication system, comprising:
a reception step of receiving, from an interference base station, control information to be used by the user apparatus for reducing an interference signal sent by a data channel from the interference base station for the user apparatus; and
a transmission step of transmitting the control information to the user apparatus as downlink control information by a downlink physical layer signaling channel, or, transmitting the control information to the user apparatus by RRC signaling,
wherein the control information includes a transmission mode, Multimedia Broadcast multicast service Single Frequency Network (MBSFN) configuration information, a number of antenna ports of a downlink reference signal, and power boosting information, and
wherein the user apparatus is configured to reduce the interference signal by assuming that the transmission mode, the MBSFN configuration information, the number of antenna ports, and the power boosting information are used by a neighboring cell.

* * * * *